(12) United States Patent
Slemmer et al.

(10) Patent No.: US 7,783,530 B2
(45) Date of Patent: Aug. 24, 2010

(54) PARKING RESERVATION SYSTEMS AND RELATED METHODS

(75) Inventors: John Blake Slemmer, Norcross, GA (US); Neil Fredrick Rivenburgh, Lawrenceville, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1472 days.

(21) Appl. No.: 10/457,889

(22) Filed: Jun. 10, 2003

(65) Prior Publication Data

US 2004/0254840 A1 Dec. 16, 2004

(51) Int. Cl.
- G06Q 10/00 (2006.01)
- G06Q 30/00 (2006.01)
- B60Q 1/48 (2006.01)

(52) U.S. Cl. .......................... 705/28; 705/1.1; 705/26; 340/932.2

(58) Field of Classification Search ....................... None
See application file for complete search history.

(56) References Cited

U.S. PATENT DOCUMENTS

| | | | | |
|---|---|---|---|---|
| 5,339,000 | A * | 8/1994 | Bashan et al. | 340/932.2 |
| 5,414,624 | A * | 5/1995 | Anthonyson | 701/1 |
| 5,504,314 | A * | 4/1996 | Farmont | 235/384 |
| 5,940,481 | A * | 8/1999 | Zeitman | 705/13 |
| 6,229,455 | B1 * | 5/2001 | Yost et al. | 340/943 |
| 6,750,786 | B1 * | 6/2004 | Racunas, Jr. | 340/932.2 |
| 6,865,539 | B1 * | 3/2005 | Pugliese, III | 705/5 |
| 6,885,311 | B2 * | 4/2005 | Howard et al. | 340/932.2 |
| 7,181,426 | B2 * | 2/2007 | Dutta | 705/37 |
| 7,391,339 | B2 * | 6/2008 | Howard et al. | 340/932.2 |
| 2002/0029164 | A1 * | 3/2002 | Sugar et al. | 705/13 |
| 2003/0004440 | A1 * | 1/2003 | Brenneman et al. | 601/15 |
| 2003/0112154 | A1 * | 6/2003 | Yoakum et al. | 340/932.2 |
| 2003/0144890 | A1 * | 7/2003 | Dan | 705/5 |
| 2004/0068433 | A1 * | 4/2004 | Chatterjee et al. | 705/13 |
| 2005/0033634 | A1 * | 2/2005 | Pugliese | 705/13 |
| 2005/0261945 | A1 * | 11/2005 | Mougin et al. | 705/5 |

OTHER PUBLICATIONS

*ABB introduces world's first wireless proximity sensor*, Control Engineering, 1 sheet, www.manufacturing.net/ctl/index.asp?layout=articleWebzine&articleid=CA219943, (May 15, 2002).

(Continued)

*Primary Examiner*—F. Ryan Zeender
*Assistant Examiner*—Asfand M Sheikh
(74) *Attorney, Agent, or Firm*—Myers Bigel Sibley & Sajovec, P.A.

(57) ABSTRACT

Parking reservation systems and methods for a parking lot having a plurality of individual parking spaces include an electronic database of an inventory of available parking spaces; and at least one processor in communication with the electronic database. The processor can be configured to: (a) accept user input regarding a request for a reserved parking space; (b) automatically reserve a parking space for a patron upon receipt of a payment therefor; (c) generate a confirmation of the reservation for the patron; and (d) automatically adjust the database of the inventory of available spaces based on the reservation. Other systems and methods are configured to identify parking lots with vacancies in a geographical region of interest.

73 Claims, 11 Drawing Sheets

OTHER PUBLICATIONS

*MICA, The Commercialization of Microsensor Motes*, Sensor Technology and Design, 8 sheets, www.sensorsmag.com/articles/0402/40/main.shtml, (Apr. 2002).

*Custom-Developed Communications System for Sandton City's Intelligent Parking Garage*, Q-Kon (Pty) Ltd., 2 sheets, date unknown but prior to Apr. 2003.

Ran, B. et al., *Intelligent Parking Garages*, UW-Madison Transportation Society, 1 sheet www.cae.wisc.edu/~uwits/education/programs/garages.html, date unknown but prior to Apr. 2003.

ifm efector, Position Sensors, 1 sheet, www.ifmefector.com/ifmus/web/position.htm, date unknown but prior to Apr. 2003.

TransCore, *Amtech Division of Intermec and Central Dallas Association Expand Automated Parking Program*, 3 sheets, www.amtech.com/news/news981005.htm, (Oct. 5, 1998).

SICK Products, *Capacitive proximity sensors*, 1 sheet, www.sick.de/de/products/categories/industrial/capacitiveproximity/en.html, date unknown but prior to Apr. 2003.

SICK Products, *Through-Beam Photoelectric Switches*, 2 sheets, www.sick.de/de/products/categories/industrial/throughbeamswitches/en.html, date unknown but prior to Apr. 2003.

SICK Products, *Inductive proximity sensors*, 1 sheet, www.sick.de/de/products/categories/industrial/induktive/en.html, date unknown but prior to Apr. 2003.

SICK Products, *Ultrasonic sensors*, 1 sheet, www.sick.de/de/products/categories/industrial/ultrasonic/en.html, date unknown but prior to Apr. 2003.

SICK Products, *Magnetic proximity sensors*, 1 sheet, www.sick.de/de/products/categories/industrial/magneticproximity/en.html, date unknown but prior to Apr. 2003.

SICK Products, *The four Detection Principles*, 1 sheet, www.sick.de/de/products/categories/industrial/reflexswitches1/en.html, date unknown but prior to Apr. 2003.

SICK Products, *Photoelectric Reflex Switches*, 2 sheets, www.sick.de/de/products/categories/industrial/reflexswitches0/en.html, date unknown but prior to Apr. 2003

SICK Products, *Photoelectric Switches with Fibre-Optic Cables*, 1 sheet, www.sick.de/de/products/categories/industrial/photoelectircswitchwithfibreopticable/en.html, date unknown but prior to Apr. 2003.

SICK Products, *P/E Proximity Switches for Roller Conveyors*, 1 sheet, www.sick.de/de/products/categories/industrial/peproximityswitchesforrollerconveyors/en.html, date unknown but prior to Apr. 2003.

SICK Products, *Contrast Scanners*, 1 sheet, www.sick.de/de/products/categories/industrial/contrastscanners/en.html, date unknown but prior to Apr. 2003.

SICK Products, *Automation Light Grids*, 1 sheet, www.sick.de/de/products/categories/industrial/reflexlightgrids/en.html, date unknown but prior to Apr. 2003.

* cited by examiner

PARKING RESERVATION SYSTEMS AND RELATED METHODS

FIELD OF THE INVENTION

This invention relates to intelligent parking lot systems and methods of operating same.

BACKGROUND OF THE INVENTION

Parking in parking lots and garages at public events, airports, stadiums, commuter lots, office buildings or other large parking areas can be problematic and time-consuming because it can be difficult to identify where available parking spaces are located, particularly in lots that are partially filled or almost filled to capacity.

In the past, certain parking lots manually counted the open spaces periodically to update a lot display board or sign that can indicate "full" or "spaces available." Other systems have counted the number of cars entering and leaving to provide an estimate of spaces available. This count data is used to update aggregate estimates of spaces available on the lot display board. The display boards have been placed at various positions about the parking lot, such as at each parking level in a multi-tier garage or at different access roads about the parking lot.

Unfortunately, often parking lots can be identified as "full" even when spaces are available because they may not offer "real-time" status that can identify where open spaces are located. Further, reservations for parking spaces have been done by dedicating a particular space for a patron or dedicating a block of reserved spaces (typically with restricted access) to patrons having special parking privileges. Occasional patrons or general admission patrons wanting to park for special events are typically advised to arrive early to be sure to obtain a parking place and/or cruise the parking lot to hope to identify an available space.

SUMMARY OF THE INVENTION

Embodiments of the present invention provide parking lot systems that can reserve selected or allocated spaces for occasional users based on an inventory of available spaces prior to when a user arrives at the location.

The reservations can be placed remotely and in advance using a global computer network (i e., the world wide web or internet), using a regional or intranet network, using a telephone or other communication means. The reservation can be made remotely and the space identifier assigned at this point in time based on the location of available spaces and relayed to the requester (upon payment). The space identifier may be associated with a restricted access portion of the parking lot and/or the entire lot may be access limited and controlled. The remotely reserved spaces may be in the same region of the parking lot or the spaces may be positioned among non-reserved spaces on the parking lot.

The parking lot may be configured to determine a real-time inventory of available spaces and identify space-specific location data that can be reserved to remote requesters to facilitate efficient utilization of parking lots. A space can be remotely reserved in advance and the physical location defined as the patron arrives at the lot based on the inventory of actual space locations available upon his/her arrival. This method does not require a "permanent" or dedicated block of parking spaces to be partitioned off for patrons requesting advance or remotely reserved parking spaces.

Certain embodiments of the invention are directed to a parking reservation system for a parking lot that has a plurality of individual parking spaces. The system includes an electronic database of an inventory of available parking spaces and at least one processor in communication with the electronic database. The processor (which may be a plurality of processors in communication) are configured to: (a) accept user input regarding a request for a reserved parking space for an event or date specific need; (b) automatically reserve a parking space for an occasional patron upon receipt of a payment therefor; (c) generate a confirmation of the reservation for the patron; and (d) automatically adjust the database of the inventory of available spaces based on the reservation.

The processor of the parking reservation system may be configured to accept user input from an occasional user of the parking lot and the electronic database of available parking spaces can be date and/or event specific. The processor may be configured to accept the user input for a reservation over a global computer network and/or to wirelessly receive the request for a reserved parking space from a patron. The reservation of a particular spot can be a "virtual" reservation that places a hold on a space or decrements the number of spaces available based upon an inventory of existing spaces and/or may use a display or sign that states "reserved" or other physical marker at the parking space.

Other embodiments are directed to methods of reserving parking spaces in a parking lot. The methods include: (a) obtaining an inventory of available spaces in a parking lot; (b) accepting advance requests for reservations of parking spaces from an occasional patron; (c) reserving a parking space based on the accepted request for a reserved parking space; and (d) updating the inventory of available spaces.

In particular embodiments, the step of updating available space inventory is carried out substantially continuously while reservations are being accepted to provide a substantially real-time count of available parking spaces. The method may also generate a confirmation (that is held locally at the parking lot or relayed remotely to the patron) with an identifier unique to a patron's accepted reservation. The confirmation may include a downloadable printable or displayable parking pass that can be printed and/or displayed by the patron. The downloadable parking pass can be generated with visual safeguards to inhibit unauthorized duplication.

Still other embodiments are directed to methods of identifying parking lots with vacancies in a geographical region of interest. The methods include: (a) electronically providing a database of an inventory of parking lots located in a geographical region of interest; (b) identifying those parking lots within the geographical region with vacancies at a time period of interest; and (c) relaying vacancy data or information to a requester.

The step of relaying can include wirelessly relaying data associated with the identified lots having vacancies to the requester and/or relaying data associated with the identified lots having vacancies to the requester over a computer network. In particular embodiments, the method can include providing an electronically accessible and searchable web page with data on parking lots in different geographical areas.

Other embodiments are directed to systems of identifying parking lots with vacancies in a geographical region of interest. The systems can include: (a) means for electronically providing a database of an inventory of parking lots located in a geographical region of interest; (b) means for identifying those parking lots within the geographical region with vacancies at a time period of interest; and (c) means for relaying vacancy data or information to a requester.

In particular embodiments, the reservation data can be transmitted to a system that automatically allocates a physical parking space to a reservation before the patron arrives at the parking lot, or as they enter the lot, using a pervasive computing or mobile communication device, such as a wireless communication device, a laptop computer, a PDA, a palm pilot or other device such as those that may be integrated in the vehicle itself.

In particular embodiments, the reserved; physical space and/or location of the lot may be displayed on a map or grid of parking lot spaces that may be relayed to a computer network such as to a web page on an internet site that can be accessed by users on individual communication devices.

DETAILED DESCRIPTION

Figure 1A:
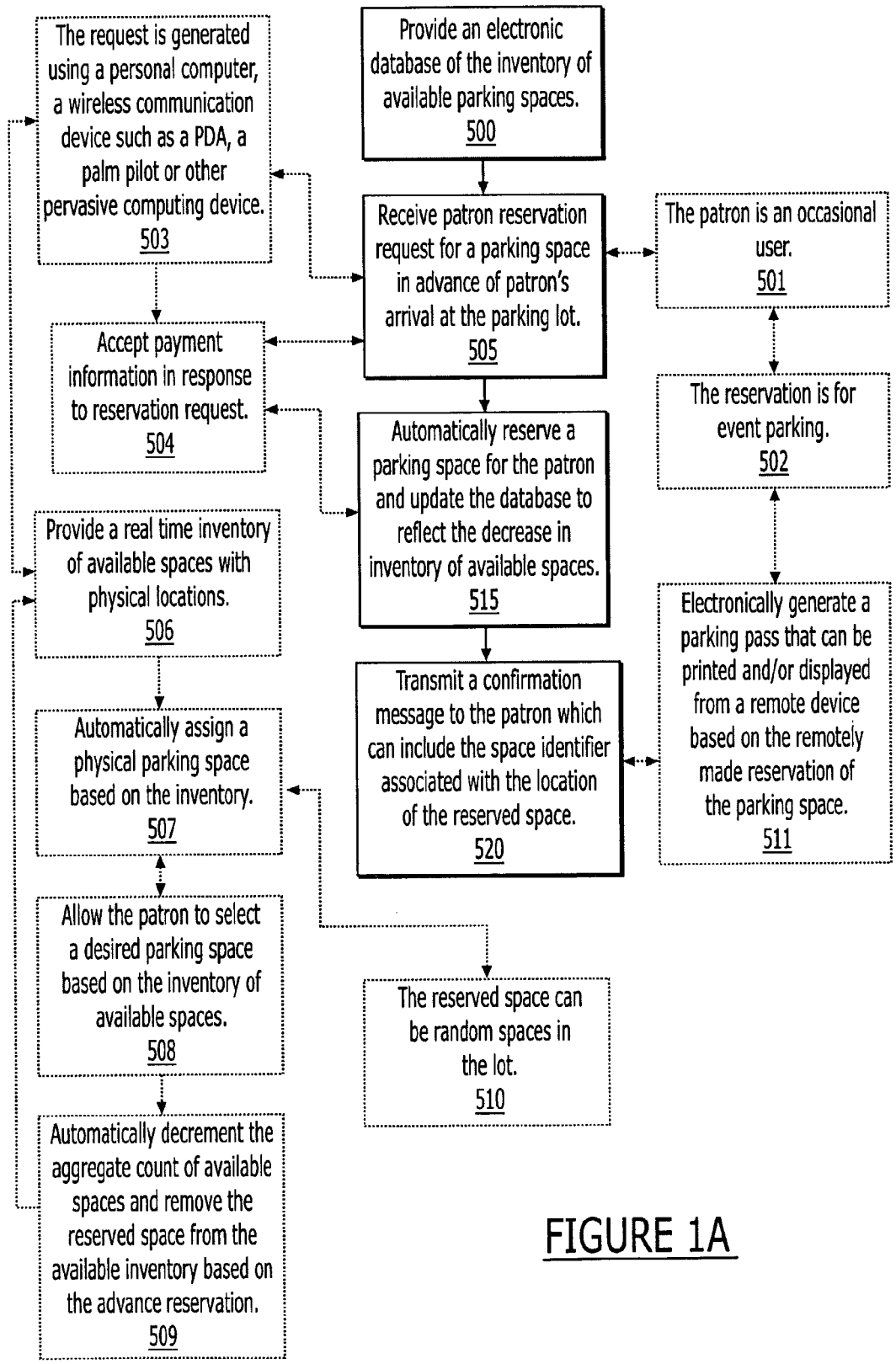
FIG. 1A is a flow chart of operations-that can be carried out according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. In the drawings, layers, regions, or components may be exaggerated for clarity. In the figures, broken lines indicate optional features unless described otherwise. The method steps are not limited to the order in which they are set forth.

Generally stated, embodiments of the present invention provide methods and systems for reserving parking spaces in a parking lot in advance of a need or event date or time. The reservation systems and methods may be particularly suitable for use with intelligent parking lot systems that can assess in substantially real-time, the availability and identify the location of the available individual parking spaces in a parking lot. The term "parking lot" includes any type of parking lots including open single level lots and/or multiple tier parking garages. The term "parking lot" can include a network of and/or a plurality of discrete lots that are commonly managed or that participate in a shared inventory management program with vacancy identification and/or inventory space pooling systems. Examples of parking lots that may fall into this group include, but are not limited to, parking lots disposed about a downtown area, a courthouse, a theme park or resort area, a convention center or other mass-attraction area, a mass-transit area, and/or about the premises of an airport.

The reservation system may be event-specific and/or accessible by occasional patrons of the parking lot. The term "occasional patron" means individuals that use the parking lot intermittently, infrequently or on an irregular basis including only once over the course of time. Thus, unlike season pass holders that may have access to partitioned reserved sections of a lot or patrons having monthly or other time-period defined dedicated "leased" spaces in a parking lot, the occasional patron is a general consumer that utilizes the parking lot on an event-specific or occasion-particular need. The term "patron" means a potential user, driver, individual or group desiring to reserve a parking space or an individual that actually reserves and/or uses a parking space in the parking lot.

The present invention may be particularly suitable for large capacity parking lots that have a large number of individual pre-marked or delineated parking spaces for vehicles. The parking lot may be for cars, trucks, buses, vans, motorcycles, bicycles or any other type of motorized or non-motorized object capable of using a parking space. The term "object detector" is used interchangeably with the term "object sensor."

As will be appreciated by one of skill in the art, the present invention may be embodied as a system, method, data processing system, and/or computer program product. Accordingly, the present invention may take the form of an entirely hardware embodiment, an entirely software embodiment or an embodiment combining software and hardware aspects, which may all generally be referred to herein as a "circuit." Furthermore, the present invention may take the form; of a computer program product on a computer-usable storage medium having computer-usable program code means embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as, but not limited to, Java®, Smalltalk or C++. However, the computer program code for carrying out operations of the present invention may also be written in conventional procedural programming languages, such as the "C" programming language. The program code may execute entirely on a computer associated with the parking lot system, as a stand-alone software package, partly on the parking lot system computer(s), partly on a user's computer and partly on a remote computer or entirely on the remote computer. In the latter scenario, the remote computer may be connected to the parking lot and/or user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

FIG. 1A illustrates operations that may be used to carry out embodiments of the present invention. As shown, the system includes an electronic database of an inventory of available parking spaces in a parking lot (block 500). A system is configured to receive a patron's reservation request or inquiry for a parking space in advance of the patron's arrival at the parking lot (block 505). The system can automatically (at least virtually, if not physically) reserve a parking space for the patron and update the inventory database to reflect the decrease in available spaces during the reservation period (block 515). A confirmation can be transmitted to the patron or the individual making the reservation (block 520).

The reservation may not be granted and/or the confirmation may be held pending receipt of payment, such as by credit or debit or charge to an existing account (such as PayPal™). The confirmation may allocate and include the physical parking space allocated to the patron or just a confirmation number that allows the patron into a reserved pool or region of parking spaces. The confirmation may be held at a local processor at the parking lot site and/or transmitted to the requestor as the reservation is confirmed. The patron can insert an identification card (such as a credit or debit card) similar to those used at automatic airport kiosks in an electronic reader such as a magnetic card reader. For example, the patron can use the same card as the card used to make the reservation. The computer then can use the credit card data as the confirmation criteria and allows the patron to enter the lot.

In other embodiments, the confirmation can include an electronically downloadable display or printout of a parking pass (block 511). The downloadable pass can be wirelessly sent to the patron and the patron can display same on his/her graphic display on a wireless device at the parking lot. For printable versions, the pass can be configured to inhibit unauthorized duplication and/or for easy verification of the authenticity of the pass such as by using color features and prohibiting copies thereof and/or by allowing only a single printed copy of the form. The parking pass form may also include the patron's name which can be matched upon entry at the parking lot to the patron using the method described above or a manual verification or comparison of identifying documents (such as a drivers license) to thereby inhibit unauthorized duplication of remotely printed passes.

Referring to FIG. 1A, the patron can be an occasional user of the facility or parking lot (block 501) and the reservation may be for event parking (block 502). Each of these operations may be implemented into a computer program as a decision point for event or other desired scheduling or data analysis purposes. As such, the database supporting the reservation system can be sorted to provide an inventory of spaces that is event specific. When several events are held at a facility during a single day, the inventory of parking spaces can be operated to provide a reservation system that is event and time specific. If an event spreads over more than one day, the database may require the patron to indicate the number of days that the parking lot space will be needed. Indeed, the system can require the patron to indicate the specific hours of use during a particular day and provide the reservation just for that period and day(s). In other embodiments, the database can be operated to generate reservations based on hourly or semi-hourly needs. For patrons going over their reserved time, a penalty parking fee may be assessed using an agreement that the patron agrees to at the time of making the reservation which can be automatically charged to a credit or debit card when the user clocks out of a gated entry at a controlled access lot.

As shown in FIG. 1A, the request for a reservation and/or an inquiry of available spaces can be transmitted or generated using a personal computer or while the patron is en route or mobile using a mobile communication device or other wireless device (block 503).

The system can be configured to provide a substantially real-time inventory of available spaces and/or the locations thereof (block 506). The system can automatically reserve and/or assign or allocate a physical parking spaced based on the inventory data (block 507). In certain embodiments, the patron can be allowed to select the desired parking space based on the inventory of spaces, which can be provided electronically for viewing by the patron (block 508). The aggregate count, of available spaces in the real-time inventory database can be decremented based on the advanced reservation (block 509). The space may be held in a reserved controlled access segment of a parking lot or each space may be configured to indicate when it is reserved (either physically at the parking space or on the computer where a lot attendant or a computer monitor can direct and/or control the parking of vehicles in the lot to inhibit unauthorized parking in the lot and/or in reserved spaces or sections.

Figure 1B:
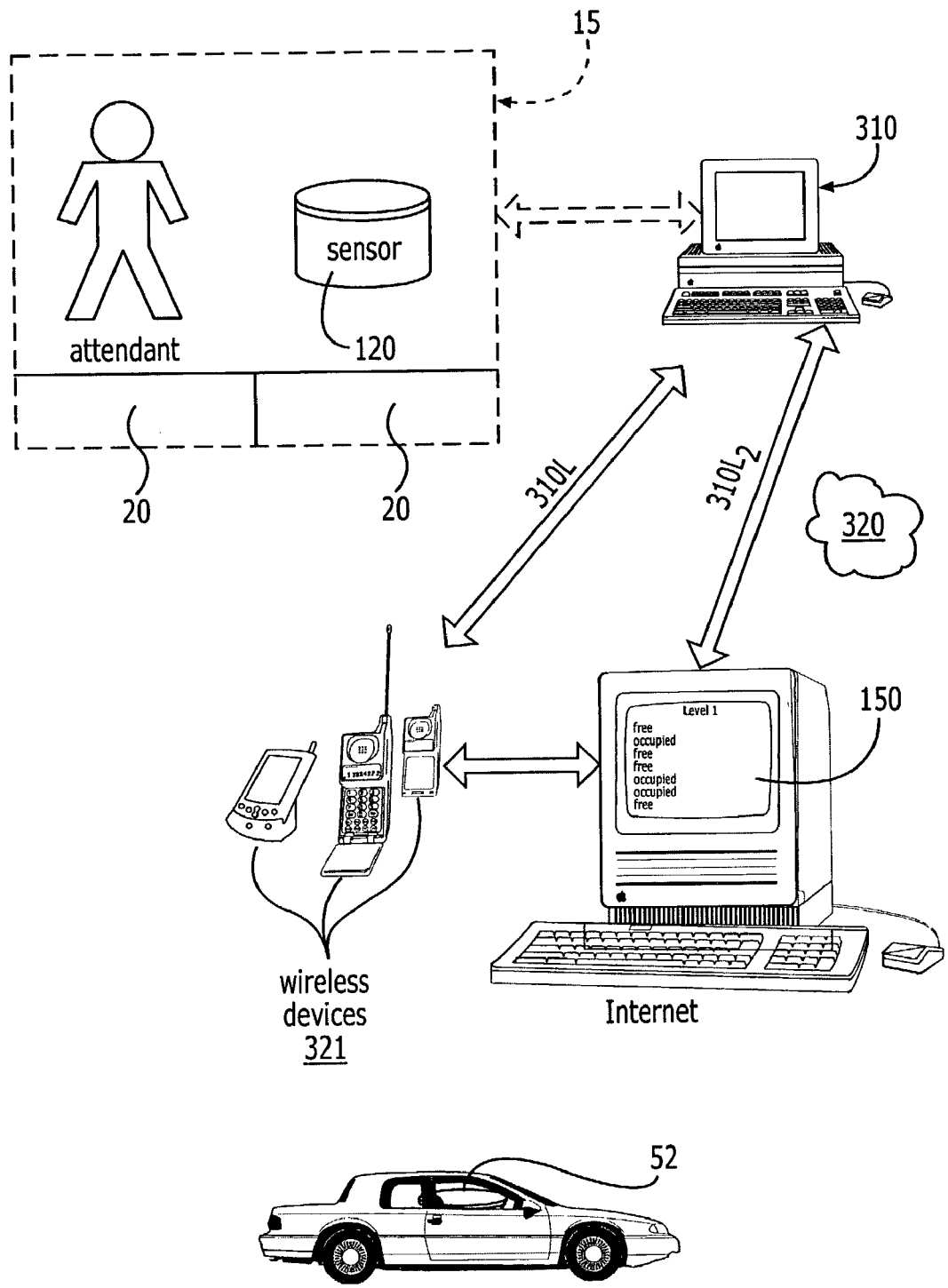
FIG. 1B is a schematic illustration of a reservation system according to embodiments of the present invention.

FIG. 1B illustrates that an inventory of available spaces 20 in the parking lot 15 can be ascertained manually and/or electronically (such as automatically using sensors 120 as will be discussed further below). The inventory can be provided to an electronic database on a processor 310 associated with the management of the parking lot 15 of available spaces 20 or that provides the status of the spaces 20 in the parking lot 15.

The processor 310 includes at least one communication link 310L to an external output device that can provide the space inventory information to a prospective parking lot patron or user. As shown, the processor 310 includes two links, 310L and $310L_2$. The first link 310L provides the link to personal (portable or vehicle mounted) pervasive computing and/or wireless communication devices 321 (typically via a communications tower as will be discussed below for the parking director embodiments), the second link $310L_2$ provides the information to a computer network 320 that communicates with personal computers 150. Fewer or greater links may be used. The pervasive computing and/or communication devices 321 can be a personal computer whether a palm, laptop or vehicle-integrated computer and the like. Alternatively, the output device may be a pervasive computing device such as: a smartphone, a two-way wireless communicator (such as the Blackberry™ wireless platform) or PDA. The communication devices 321 may be operated as the operator approaches the parking lot in the vehicle 52 to obtain the reservation en route or in advance of arrival at the parking lot.

Figure 2:
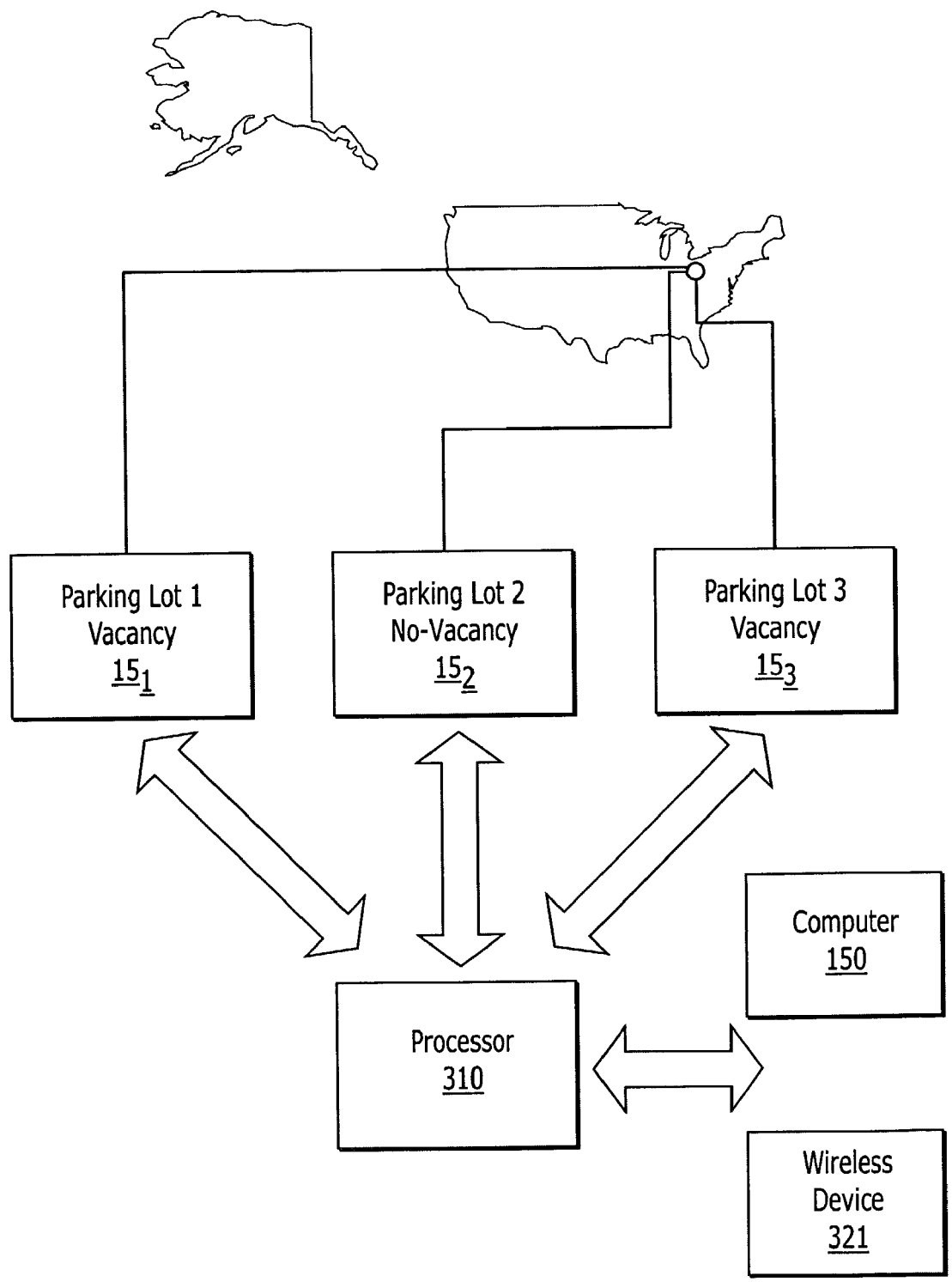
FIG. 2 is a schematic illustration of a parking system configured to obtain input from physically separated parking lots.

In certain embodiments, as shown in FIG. 2, the present invention can provide systems and methods of identifying parking lots $15_1$, $15_2$, $15_3$ with vacancies that can be grouped in a common geographical region of interest. Greater or lesser number of lots 15 in a particular geographic grouping may be provided. An electronic database that may reside at a processor 310 at a control station can be generated of parking lots that are coded by geographic area, physical address, and/or their proximity to a destination area. The system can be configured to receive data updates from multiple parking lots (typically during business hours) and identify those parking lots within a geographical region of interest that have vacancies at a time period of interest to a requester, through a desired communication means such as via a mobile or wireless device 321 or a computer 150, inquiring about parking and the vacancy data or information can be relayed to the requester.

The database may include selected parking lots and/or lots participating in a shared information system or inventory management system. Those parking lots can provide electronic input of whether they have vacancies. A parking lot can contact the control station to note when they are full so that they are not identified as having vacancies upon inquiry from a requester or potential patron. In particular embodiments, the parking lots can provide data to the database to update the number of vacancies that they have on a relatively regular basis such as hourly or even every 5-10 minutes or so, or even substantially continuously (i.e., automatically relaying the aggregate count of spaces via a computer link or other communication means).

The parking lots may be discrete spatially separate lots not under common ownership or management and/or may include lots that are commonly owned. The methods and systems can be configured to electronically provide a database of an inventory of parking lots located in a common geographical region of interest. The database may include a plurality of different sub-databases of different cities or portions thereof and/or may include a broad larger database that codes or allows for searchable identification of a localized area in a geographical region of interest based on data collected from a plurality of cities, regions and the like. The area of interest may be a landmark or building and the database can be searchable to identify parking lots in the vicinity that have vacancies. The database may be operated based on event and/or day specific availability.

In operation, the data in the database associated with the parking lots identified as having vacancies can be wirelessly relayed to the requester and/or relayed to the requester over a computer network (such as a global computer network). The database may be associated with an electronically accessible and searchable web page with parking space data on parking lots in different geographical areas. The web page can be configured to allow the requester to input search parameters and then the identified vacancy data can be generated responsive to the search parameters input by the requester with respect to the database that can support the web page. For example, the requester can search the data on the web site by keyword, geographic map or by landmark, name of building, street, city, state, and the like. The requester can select a location on a visual map of a region and adjust the boundaries of the acceptable locations of parking lots adjustable by the requester. The area of interest and/or a parking lot of interest may be selected by touching the screen, via mouse point and click input, or other desired user input. Links to a web site or telephone dial-up may be provided with the parking lot data.

The vacancy data or information relayed to a requester can include a list of parking lots having vacancies with names and addresses thereof that are identified as being in the geographical region of interest. The data may include telephone numbers of the identified lots, parking charge estimates, hours of operation, recent criminal activity in the lot, the size of the lot, average size of parking spaces, whether the lot has night lights, the distance of the lot from various typical destinations and other data that may be of interest to a requester. The relayed vacancy data or information may include a graphic visual display of parking lots in the geographical region of interest on a map with those lots having vacancies shown or highlighted or otherwise indicated thereon. The parking lots without vacancies may also be shown on the display in a manner different from the lots with vacancies on the map (or not shown at all). For example, the parking lot with vacancies may be shown in green, white or other suitable color while those that are full can be shown with lines, "X's" or other marks thereover, and/or in black, red or other visual differentiating means.

In certain embodiments, the list of parking lots with vacancies can be compiled to present the lots in a predetermined ordering arrangement. The ordering may be based on a sponsor of the service (those being placed higher on the list) or the lots may be identified in a rotating order that shifts the lots upon each inquiry from a different requester. The ordering may be in alphabetical order or with the least, expensive to the most expensive parking rates. The ordering may be based on preferences input by the requester (such as location, lots with larger spaces and the like).

Alternatively, the identified lots may be presented in a visual graphic display and the requester may be able to select a particular parking lot of interest by touching the screen proximate thereto which can then bring up the data associated with that lot. The process can be repeated to obtain data about other identified lots on the map.

The list of identified lots or the map of available lots can be presented to the requester via the wireless device and/or computer along with a telephone dial up service, and/or a computer or wireless link to a selected lot on the list to allow automatic connection therebetween.

Figure 3:
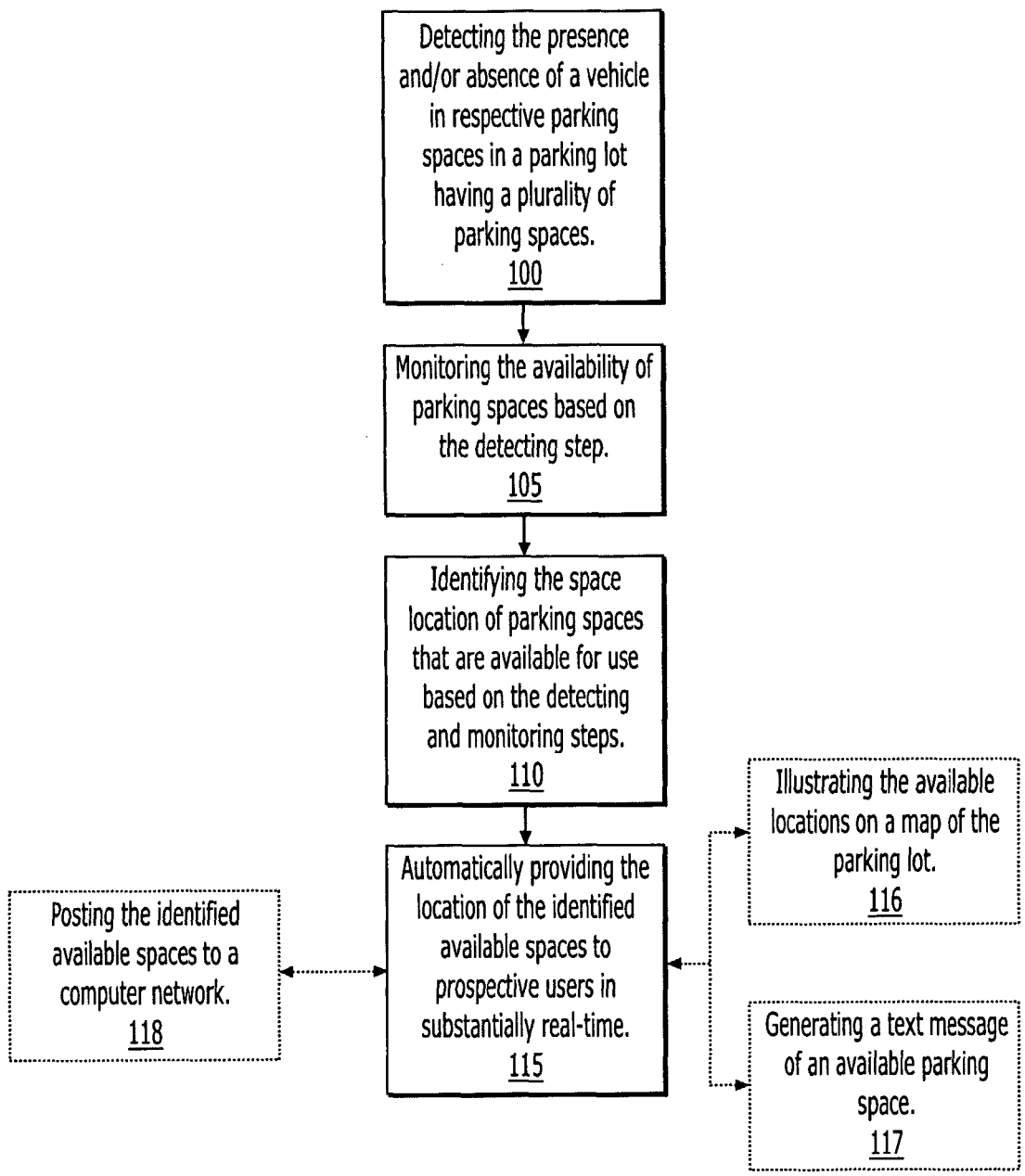
FIG. 3 is a flow chart of operations that can be carried out according to embodiments of the present invention.

FIG. 3 illustrates operations that may be used to carry out embodiments of the present invention. As shown, the presence and/or absence of a vehicle in respective parking spaces in a parking lot can be detected (block 100). The availability of parking spaces can be monitored based on the detection (block 105). The space location of parking spaces available for use can be identified (block 110). The location of the identified available spaces can be automatically provided to prospective users based on substantially real time detection of the available spaces (block 115). The location of the identified spaces can be posted to a computer network (block 118). The available space locations can be identified by visually relaying an illustration of the locations on a map or grid of the parking lot (block 116) and/or by generating a text message of one or more available parking spaces to prospective parking lot customers (block 117). In addition, a sign or display can be positioned at the space(s) itself.

Figure 4:
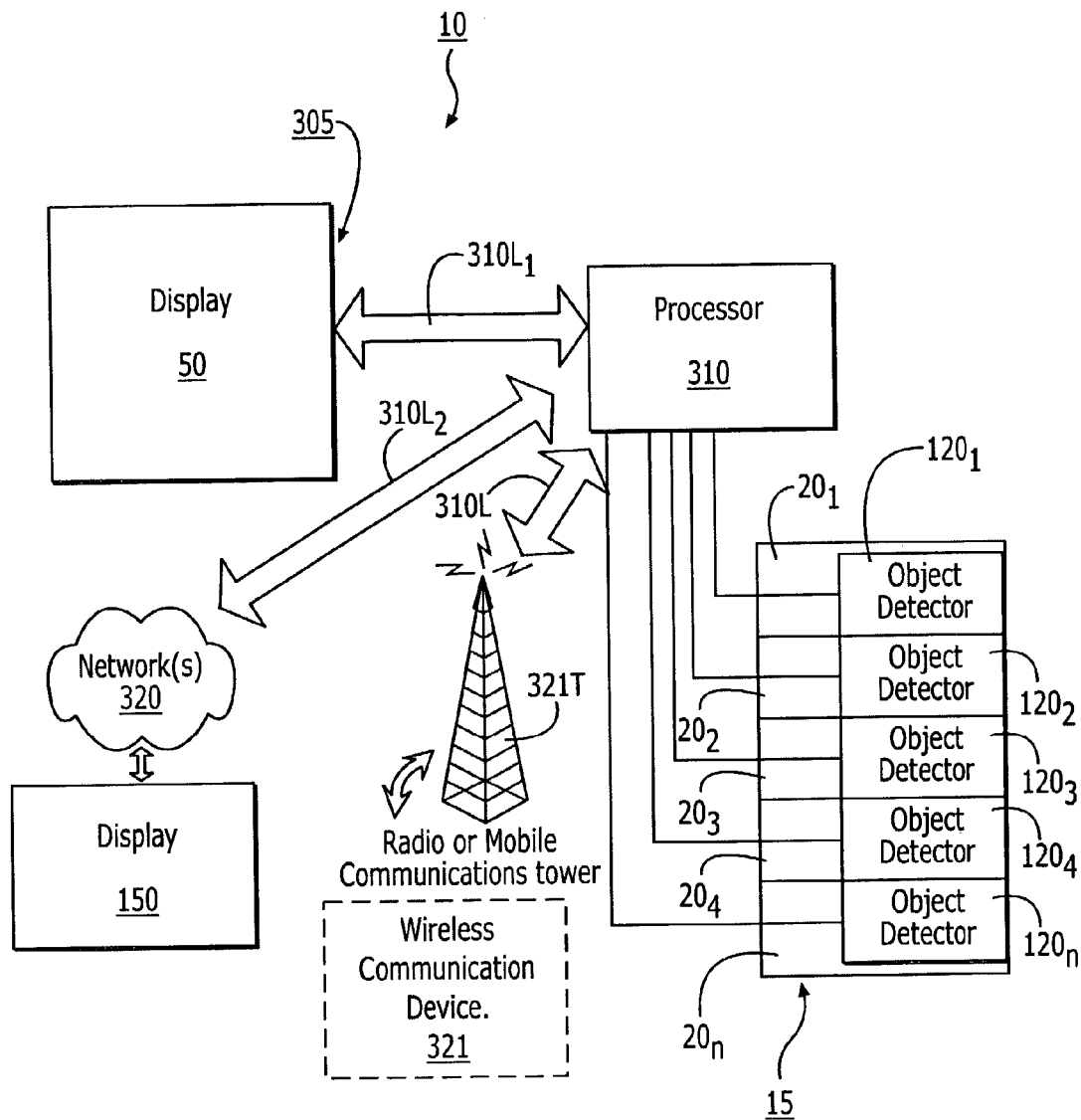
FIG. 4 is a schematic illustration of an intelligent parking system according to embodiments of the present invention.

FIG. 4 illustrates one embodiment of an intelligent parking lot system 10 according to the present invention. As shown, a parking lot 15 has a plurality of individual parking spaces 20, shown with reference to elements $20_1, 20_2, 20_3, 20_4 \ldots 20_n$. Each parking space 20 that is monitored for availability can have a corresponding object detector 120, shown with reference to elements $120_1, 120_2, 120_3, 120_4, 120_n$. The system 10 also includes at least one processor 310 in communication with the object detectors 120. The processor 310 can be a plurality of distributed-processors and/or may be configured as at least one controller. The processor 310 may be configured to communicate with the object detectors 120 in a wireless and/or wired manner. The processor 310 is configured to monitor the object detector data to identify available parking space locations and provide that information to prospective parking lot customers. The processor 310 includes at least one communication link 310L to an external output device that can provide the space information to a prospective parking lot user. As shown, the processor 310 includes three links, $310L_1$, $310L_2$, and $310L_3$. The first link $310L_1$, provides the information to a display 50, the second link $310L_2$ provides the information to a computer network 320, and the third link $310L_3$ provides the link to a communications tower 321T that, in turn, communicates with personal (portable or vehicle mounted) pervasive, computing and/or communication devices 321. Fewer or greater links may be used.

The pervasive computing and/or communication devices 321 can be a personal computer whether a palm, laptop or vehicle-integrated computer and the like. Alternatively, the output device may be a pervasive computing device such as a smartphone, a two-way wireless communicator (such as the Blackberry™ wireless platform) or PDA.

The computer network 320 can be a local area network, a wide area network or a direct connection and may include an intranet (computers connected within a particular organization, company, coalition, or group), an extranet, a Virtual Private Network (VPN), a global computer network such as the Internet, including the World Wide Web, or other such mechanism for allowing a plurality of data processing systems with respective output displays 150 to communicate.

The communication link to the computer network 15 is illustrative of various suitable communications mechanisms that allow the processor 310 to communicate over a computer network. Such a communications link 310L may be provided, for example, by a network interface of a data processing system in communication with the processor 310. Typical network interfaces may include Ethernet, Token Ring or other such direct connections to a computer network provided, typically, by network interface card (NICs) or may be provided by, for example, a modem, including cable modems, Digital Subscriber Loop (DSL) modems, including ADSL an sDSL modems, wireless modems or conventional telephone modems which provides communications to a computer network.

Figure 5:
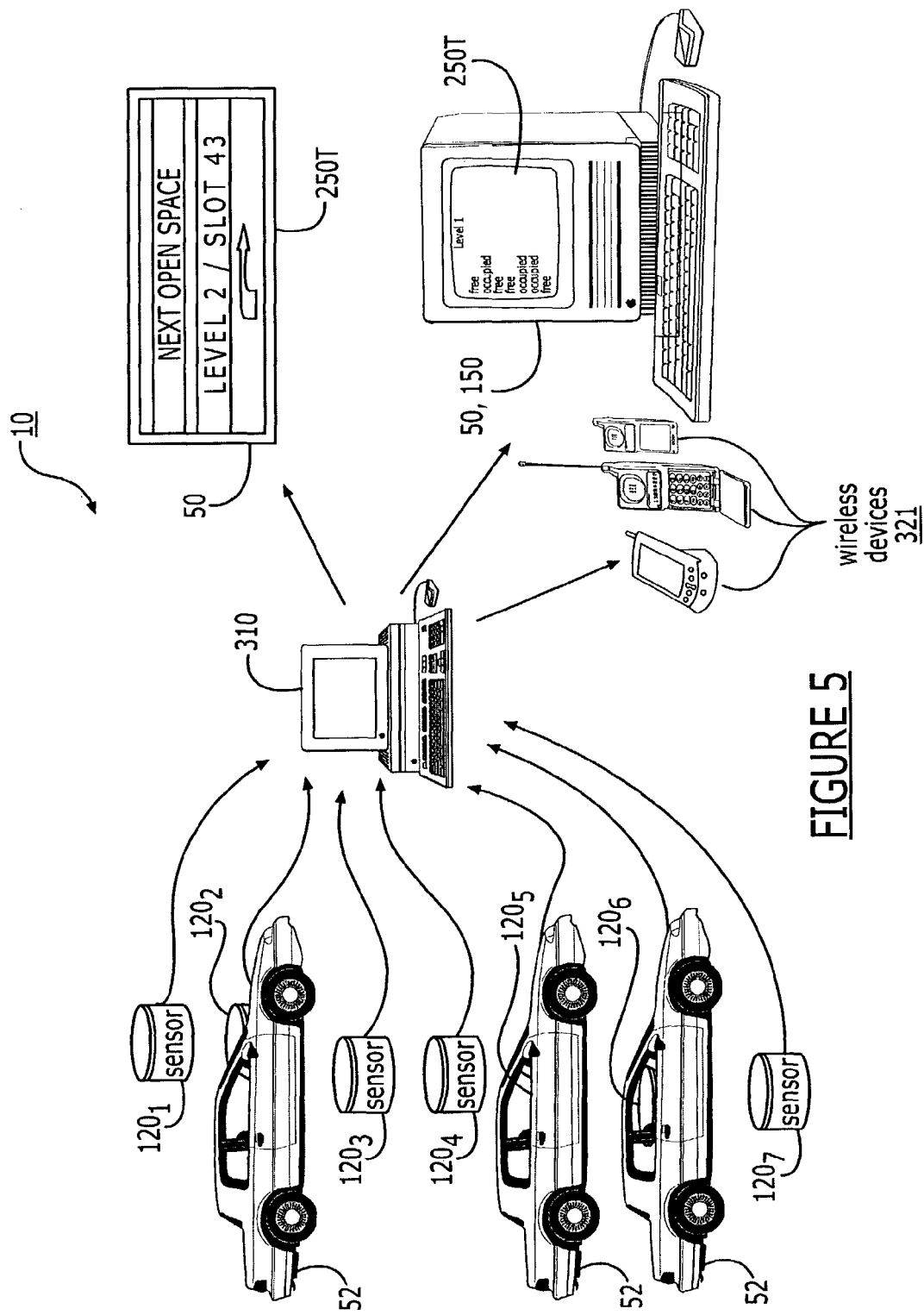
FIG. 5 is a schematic illustration of an additional embodiment of an intelligent parking system according to the present invention.
Figure 7A:
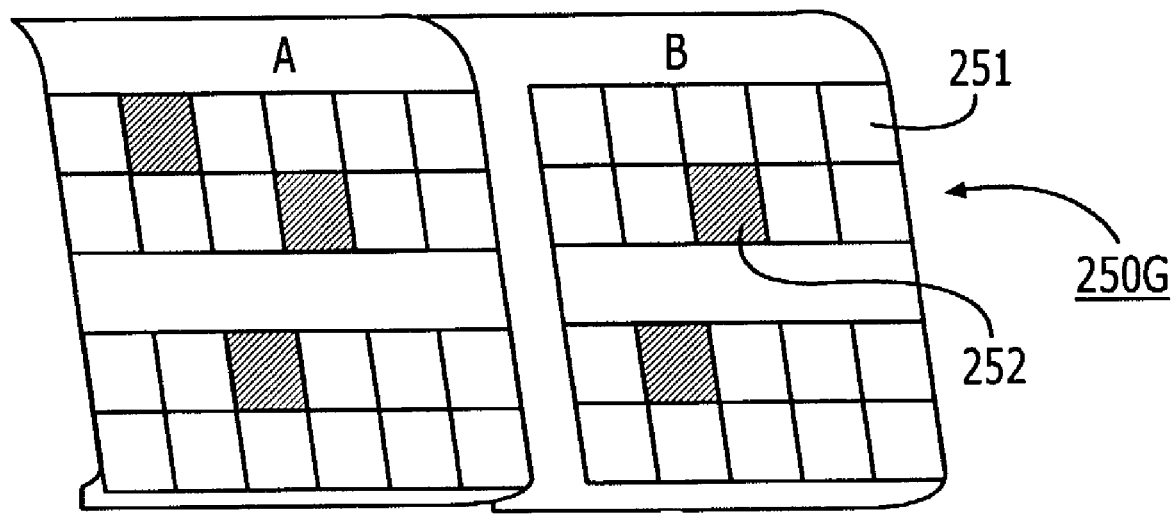
FIG. 7A is a display of a map of the locations of available parking spaces provided by embodiments of the present invention.
Figure 7B:
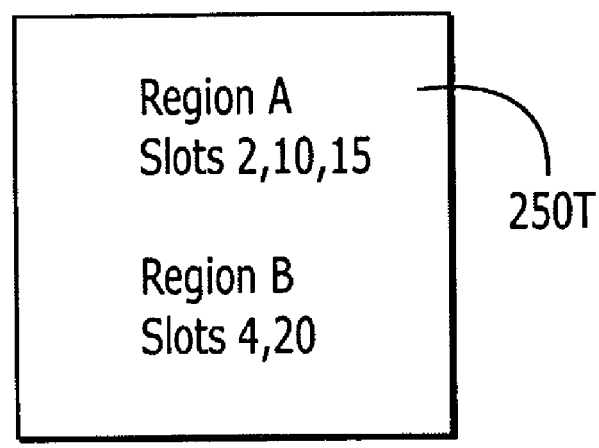
FIG. 7B is an output and/or display of the location of available parking spaces provided by embodiments of the present invention.

The information on the available parking spaces can be generated and displayed to one or more output devices 50, 150, 321 in a text and/or graphic format. For example, as shown in FIG. 7B, the identified available space or spaces can be presented textually 250T, such as by using an alpha/numeric indicator summarizing one or more available spaces to a prospective user. As shown, available slots or spaces are summarized in a spatially grouped manner, with the unoccupied slots or spaces available within a localized region or geographic partition of the lot being listed together. Other text formats can also be used, such as, "Region A, space 45" or "A45" and the output can provide the closest unoccupied slots first as a user enters the lot. FIG. 5 illustrates the data presented serially according to space per level and row.

Alternatively, the information can be provided in a visual grid or map of the parking lot to help a user spatially identify the location of the available space(s). The visual grid can be a fixed display with LED's or other lighting means used to indicate available spaces (not shown) that are operatively associated with the processor 310 for substantially real-time updating of the map (at least during high traffic periods as will be discussed further below). As shown in FIG. 7A, the output can be a computer generated graphic 250G of a region or regions in the lot that visually contrast the available positions 251 with unavailable positions 252. For example, the visual graphic presentation can provide a floor diagram and highlight and/or visually enhance unoccupied spaces. The reserved or occupied spaces can be identified with color, such as red or black with different colors one for reserved and one for occupied while the available spaces can be identified in a third color such as green or white.

In certain embodiments, a selective or computer adjustable grid of reserved parking spaces can be generated based upon demand to keep the reserved spaces in a common zone or region of the parking lot. The grid of reserved spaces may be displayed in a desired color to indicate the "reserved section" of spaces for an event or day. The grid perimeter or boundaries may be physically blocked by lot attendants, cones, or other structures such as modular access gates that can be opened and/or closed or positioned as the grid indicates to provide a restricted access region that is adjustable in size.

Of course other colors and/or gray tones with visual contrast formatting can also be used. Alternatively, the output can be arrows positioned on displays to direct a prospective user to an unoccupied and/or available space. In any event, the identity of the available parking space(s) can be provided to one or more external large signage (typically fixed position) displays 50 located proximate to and/or in the parking lot such as at entrances and/or access roads to the lot as well as at regional positions within the parking lot.

The available space location data can be audibly provided using an automated voice translation system that converts digital space data to a verbal message that can be transmitted over predetermined broadcast systems such as radiochannel(s) thereby directing the driver of a vehicle to a lot and/or open space as they arrive in the vicinity of the parking lot.

The system 10 can also be configured to generate aggregate data of the number of spaces available. In addition, in certain embodiments, the system is configured to allocate a first parking space to a first vehicle on a first time entry into the parking lot, and then allocate a second parking space to a second vehicle that enters the parking lot thereafter and identify this information or assign the spaces in substantially real time as the driver enters or proceeds through the parking lot.

The system 10 can be configured to display a selected parking region having a cluster of open regions in a graphic format proximate a parking lot entry site and textually display parking lot locations for more isolated available spaces.

The system 10 can also be configured to exclude parking spaces from the spaces identified as available for those spaces that are under repair or blocked from available parking (such as for safety reasons) as being unavailable even though an object may not be positioned/parked therein. In particular embodiments, the system 10 can virtually reserve parking spaces based on pre-orders of users that specify date and time of parking lot space anticipated, and then identifying to the user the parking space so reserved.

In particular embodiments, the unoccupied space(s) can be sent via text or voice message to a wireless communication device. The message can include navigational instructions to help guide a prospective parking lot customer to a particular space. For example, the instructions may state that G165 is available and to park there one can "proceed to entrance 1, turn left, go straight past two rows, turn left and enter the G sector. Space 165 is midway between the two aisles on the left as you approach this location."

The unoccupied or available space data may be provided by vehicle-integrated components such as internal navigation systems, Onstar(R) systems, and even broadcast over a selected (typically AM) radiochannel.

FIG. 5 illustrates one embodiment of the intelligent parking lot system 10. As shown, in operation, the detector 120 can be configured to detect when a space is occupied by a vehicle 52 and relay this data to the processor 310. Alternatively, the detector 120 can be configured to detect when a space is unoccupied. Each parking space can have its own one or more detectors, or the space may share one or more detectors with one or more neighboring spaces. In the embodiment shown, the detectors 120 can be wired to a power source and/or the controller 310. Each detector 120 can include a unique port address or other address identifier means that correlates it to its physical location in the parking lot. The system 10 may have a computer correlation program that matches detectors 20 with assigned locations or the detectors 20 may have encoded identifier data that the processor 310 can use to identify from where the detected data is from. The system 10 can include a computer program that can identify whether spaces are available for reservation and/or that can reserve a particular available space based on a request from a potential patron in advance of his/her arrival at the lot.

Figure 6:
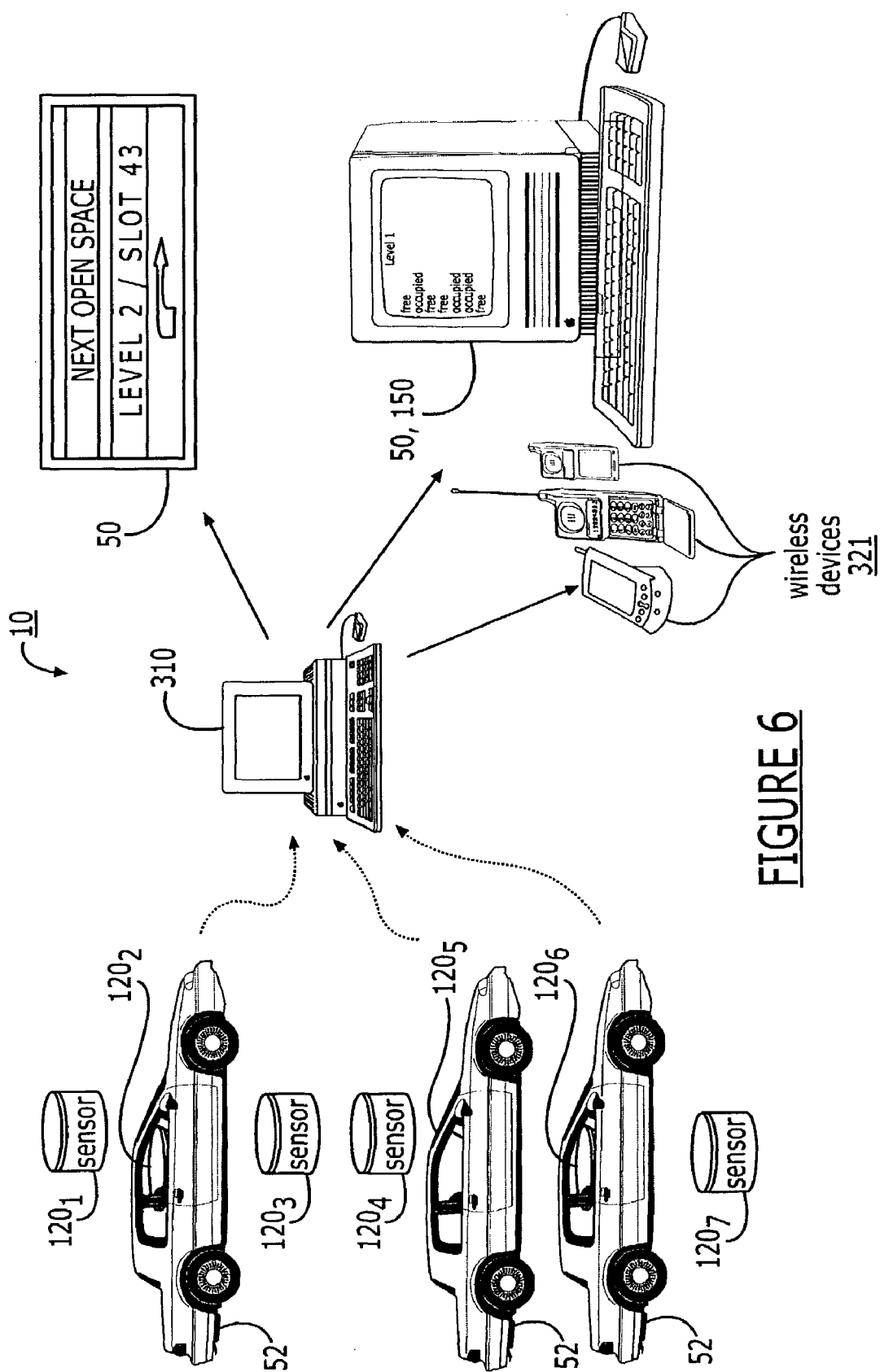
FIG. 6 is a schematic illustration of yet another embodiment of an intelligent parking system according to the present invention.

FIG. 6 illustrates that the detectors 120 can be configured to wirelessly communicate with the processor 310. In this embodiment, the data from the detectors 120 can be bit encoded for identification purposes. The detectors 120 may be configured to operate using battery power and may be rechargeable and optionally include a solar or photocell recharger. For battery-powered embodiments, the detectors 120 may be configured to operate to have an extended battery life of at least about three months to allow for reduced maintenance requirements. A low-battery signal can be relayed to the controller 310 to allow for preventative just-in-time maintenance protocols.

Examples of object detectors 120 may include, but are not limited to, magnetic proximity sensors, photoelectric switches such as photoelectric proximity or reflex switches (which may use emitter/reflector configurations), optical sensors such as brightness detectors, light grids, infrared switches, inductive proximity switches, capacitive proximity switches, ultrasonic sensors and the like. Examples of commercially available position or proximity sensors are described at URL sick.de/de/products/categories/industrial. In other embodiments (or in addition thereto), the object detector 120 can include a camera that obtains digital images that can be digitally analyzed to determine whether a space or spaces is empty.

In certain embodiments, the detectors 120 can include an RFID (radiofrequency identification) circuit as well as one or more of the active sensing elements. The object detectors 120 may be configured as compact or microsensors with integrated sensing, processing, and communications to yield a low-power smart networked-enabled wireless detector 120 with extended battery life of greater than three months. See, e.g., Control Engineering, *APP introduces world's first wireless proximity sensor*, May 15, 2002 and *Sensor Technology and Design, MICA The Commercialization of Microsensor Motes*, April 2002, url sensormag.com/articles/0402/40, main.shtml, the contents of these references are incorporated by reference as if recited in full herein. Combinations of the object sensors can also be used.

At least one detector 120 is positioned in proximity to a respective parking space. When no vehicle is present in the parking space the detector 120 can be configured to send no signal to the processor 310. When the detector 120 detects the presence of a vehicle, it sends a signal that is correlated to its location. The processor 310 analyzes the signal data and outputs the location of the available parking spaces. The output can be directed to a display sign(s) or board(s) proximate the parking lot. Typically, the display boards or signs are mounted at entrances, major parking sections or partitions, including each floor or tier, as well as provided to a web page and/or sent to a wireless personal device as noted above. If a space is reserved the physical or computer generated image or text representing same can include indicia or markers that indicates that the space is not available. If a different user attempts to park in a reserved space, the computer program and/or system can be configured to generate an improper parking alert at the central station and/or locally at the parking space.

In certain embodiments, the processor 310 can provide information about the occupied and/or unoccupied or available spaces as web pages that may be predefined and stored at a local device. Such web pages may also be dynamically generated to incorporate substantially real-time parking data. The web pages may be Hypertext Markup Language (HTML) common gateway interface (CGI) web pages. The web pages may also be or include Java scripts, Java applets or the like which may execute at the processor 310. As will be appreciated by those of skill in the art, other mechanisms for communicating between a web server and a client may also be utilized. For example, other markup languages, such as Wireless Markup Language (WML) or the like, for communicating between the local processor and the prospective parking lot user using an output display 50, 150, 321 may be used.

In certain embodiments, the system 10 can be configured so that the detectors 120 may be selectively activated during peak parking periods and deactivated, placed on stand-by or watchdog mode or be unpolled during lesser traffic periods to reduce power consumption. That is, the monitoring may be implemented at desired polling periods that activate only when the lot aggregate number indicates that the parking lot has reached a predetermined threshold such as about 20%, and typically at least about 30% or more, of capacity.

In certain particular embodiments, a respective detector 120 can be configured to be powered or at full power only at certain times. For example, the detector 120 can be deactivated or put in a sleep or standby mode for a desired interval from the time that the detector 120 first detects a vehicle is parked therein. For example, in an hourly lot, the detector 120 in an occupied space may be deactivated or its power placed in sleep or standby mode for at least 15 minutes after the detector first determines the space to be occupied. For longer term parking, the detectors 120 can be programmed to go into standby or disconnect power for at least one hour, typically 2-4 hours, and more typically 4-6 hours, from the time a vehicle is determined to be parked in the space, and then reactivated at desired time periods to confirm that the space is still occupied. The detector 120 may be selectively powered to operate once per hour after the first 2-4 hour period for a certain interval and then decremented to a certain number of minutes. In other embodiments, the detector 120 may be configured to substantially continuously monitor the status of the parking space.

In certain embodiments, the detector 120 can be configured to provide a signal only when a vehicle is present and send no signal when unoccupied. In other embodiments, the detector 120 can operate in the reverse by sending a signal only when unoccupied. This may be particularly appropriate when the system is not activated until the lot is above a certain level. In particular embodiments, the system 10 can be configured to send a signal only when occupied when the lot is under a certain capacity threshold (with more spaces empty than occupied) and then operate in the reverse and send a signal only when the space is unoccupied when the lot is above a certain threshold (with more spaces occupied than not).

Figure 8:
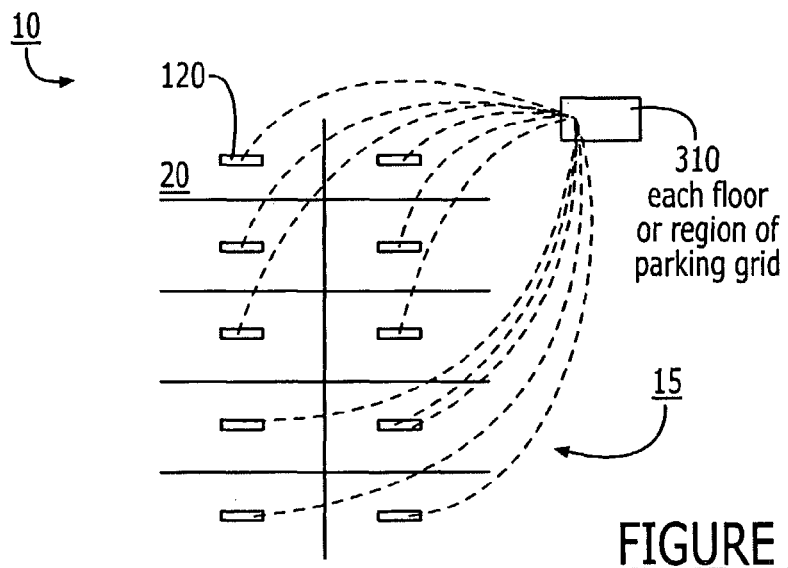
FIG. 8 is a schematic illustration of a portion of a parking lot having at least one object sensor/detector at each parking space according to embodiments of the present invention.
Figure 9A:
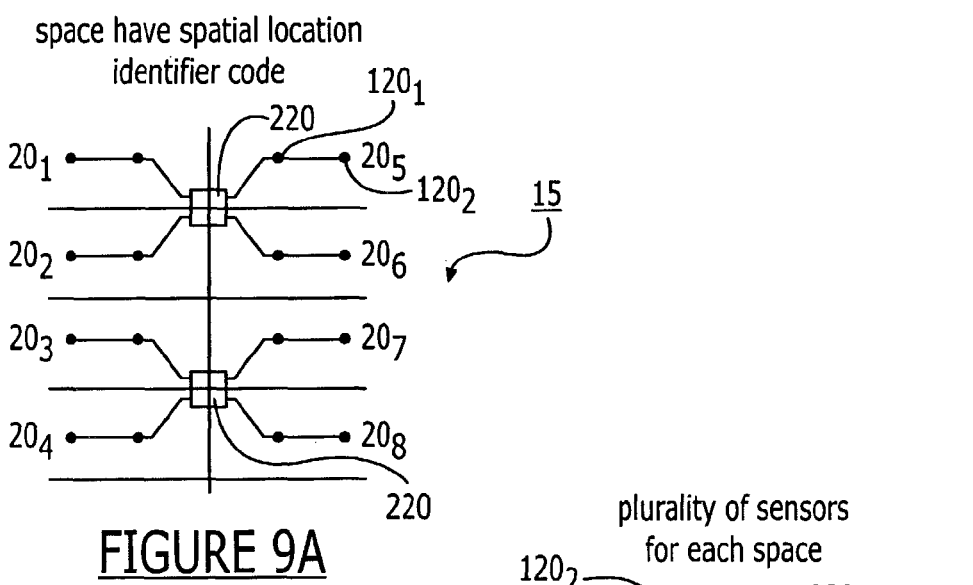
FIG. 9A is a schematic illustration of a portion of a parking lot having a plurality of serially connected sensors/detectors for each parking space according to embodiments of the present invention.
Figure 9B:
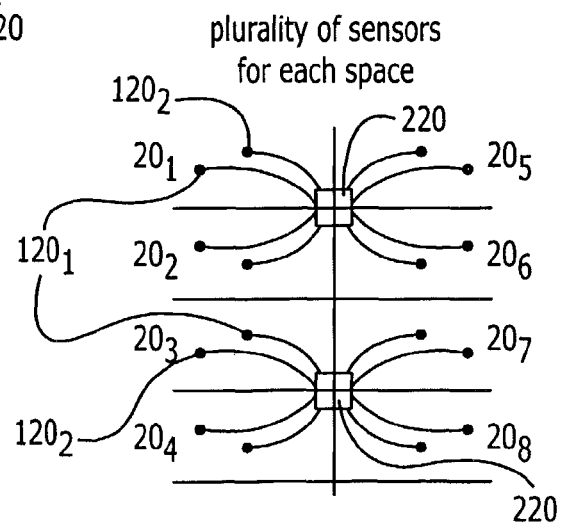
FIG. 9B is a schematic illustration of a portion of a parking lot having a plurality of sensors/detectors for each parking space according to yet other embodiments of the present invention.

FIG. 8 illustrates that a single detector 120 may be positioned on the floor of a respective parking space 20 in a parking lot 15 and communicate with the processor 310. The detector 120 may be configured to reside in the center of space or to the, side. FIG. 9A illustrates that a plurality of detectors 120 may be positioned with a parking space 20. As shown, two detectors in series 120₁, 120₂ can be placed in the space 20. As shown, the system 10 may include a plurality of sub-relay stations 220 that communicate with a plurality of detectors 120. The sub-relay station 220 then communicates with the processor 310. The substation can be used to power or transmit data and may be employed with any the embodiments described herein. The sub-relay station 220 can be wired to the respective detectors 120 or operate in a wireless communication mode as described above for other embodiments. Similarly, the sub-relay station 220 can be wired to the processor 310 or operate in a wireless mode. As shown, the sub-station 220 can be positioned adjacent a position that allows communication with four spaces. Other configurations and numbers of detectors in communication with the sub-relay station can also be used. FIG. 9B illustrates that the system 10 can employ a plurality of detectors 120₁, 120₂ per space 20 in a lot 15.

Figure 10:
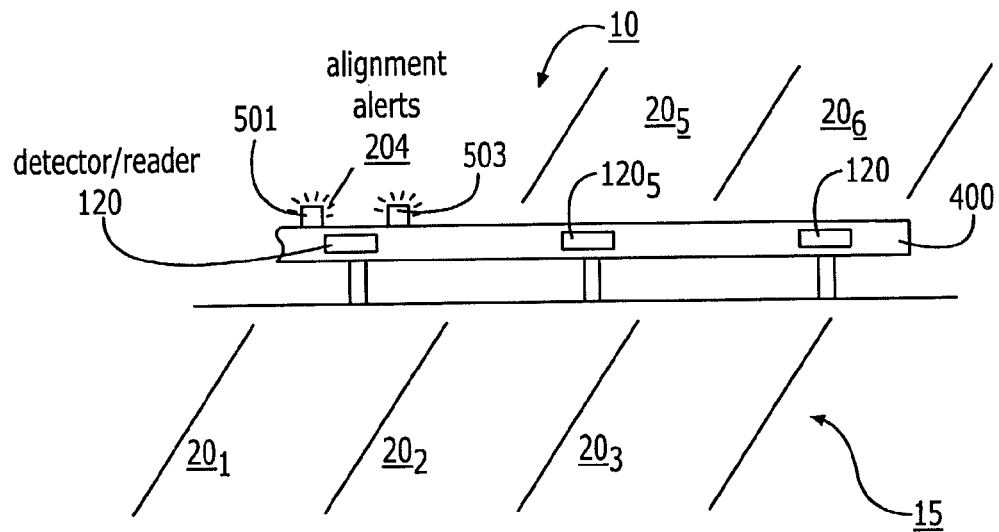
FIG. 10 is a schematic front view of a portion of a parking lot with a parking rail holding object sensor/detectors for respective parking places according to embodiments of the present invention.

FIG. 10 illustrates that the detectors 120 may be placed on a rail 400 that extends centrally between adjacent spaces 20 (between front to front parked vehicle position). The rail 400 can hold a detector 120 for the two adjacent spaces, one on each side of the rail 400. The rail 400 can also hold supplemental components such as a proximity alignment alert device 501 to visually indicate when the user is in proper alignment and/or an emergency alert 503 (alarm and/or call device) which can be activated when a customer needs assistance. The emergency alert 503 can be positioned at each space or at selected locations. The emergency alert 503 can be in communication with the processor (directly or through a substation) to automatically identify the location of the triggered alert. The rail 400 may be configured so that the sensor is positioned at least at a standard bumper height, although other configurations can also be used. The rail may also hold "reserved" space signs or displays that can be computer operated or provide equipment that generates an audible and/or remote alert when an unauthorized vehicle is in the space.

In certain embodiments, one or more object detectors 120 can be mounted on a pole or rod located above the parking floor (typically above the height of the vehicles) that can obtain periodically obtain or take a photograph or image of the parking space(s). The system 10 can then analyze the digital image to determine whether a space is occupied or empty.

It is noted that the detector 120 may be positioned at any suitable location in communication with a parking space 20 so as to be able to detect when the space is either and/or both occupied and/or unoccupied by an object. For example, the detectors 120 may be mounted to existing structures (walls, ceilings, curbs) in a lot 15 or to added structures as suitable.

Figure 11:
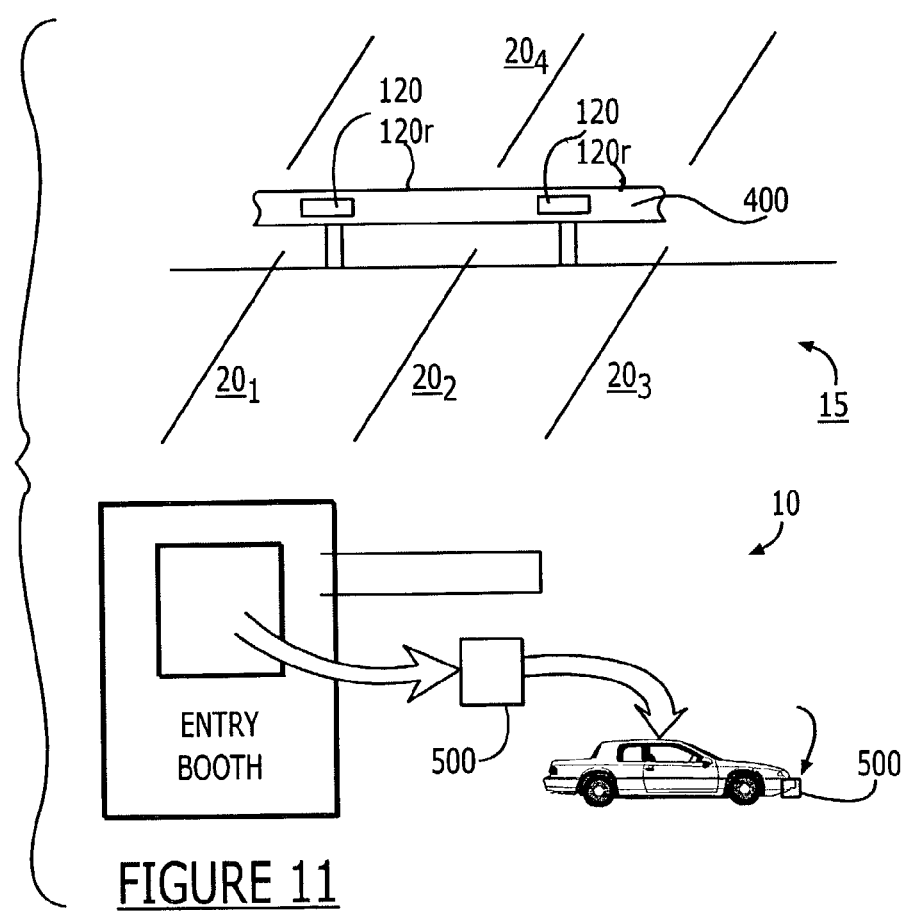
FIG. 11 is a schematic illustration of a parking system having parking passes/tags that can be dispersed for each vehicle and read at respective parking places according to yet additional embodiments of the present invention.

In certain embodiments, as shown in FIG. 11, the system 10 can be configured to issue a pass or tag 500 for each vehicle that is placed in a predetermined region on a respective vehicle so as to be able to be read by a reader at the parking space. The tag 500 may be generated in response to an advance reservation (which code or tag may be printed at a remote site). In other embodiments, the tag 500 can be issued at the entrance to the lot 15 or pre-ordered. The tag 500 can be correlated to user-specific data that is entered for a tag identifier in a computer. The user-specific data can include a vehicle type, license plate number and may even include a driver name. The tag 500 can be a bar code or RFID tag that can be automatically read by a reader 120r at a parking space positioned proximate the space where the user's vehicle 52 is parked in the parking lot 15. The detector 120 has a unique space identifier and the parking system 10 receives the space location and the user information from the tag 500 at the parking space 20 so that it can determine where the user is parked and/or verify that the space 20 is reserved for the vehicle entering or parked therein. If the user forgets where he/she is parked (upon his or her return), entering tracked data such as one or more of the license plate, name or tag number into the parking system 10 can allow the vehicle 52 to be conveniently physically located. The reader 120r may be incorporated into the detector 120 or may be a separate component. The reader 120r may be configured to automatically read the tag 500 if the tag 500 is positioned in the appropriate region on the vehicle such as a door, tire cap, window, etc . . . (shown as the front bumper). In certain embodiments, the tag 500 can be magnetic or include an adhesive or otherwise configured to attach to the vehicle.

In particular embodiments, the user-specific data may also indicate a target exit time for space planning. The system may be configured to place "holds" on open spaces or size the restricted or reserved zone. The system can place a hold on a particular space using a reservation indicator at a particular space based on a pre-order for a space. The hold does not have to be for a permanent "reserved" space but can be based on a statistical probability of what space will be open when the order time-frame needs the space allowing increased lot space utilization over dedicated "reserved" spaces or reserved sections of constant number.

In certain embodiments, the exit to the parking lot 10 can include an anti-theft review. That is, the exit can also include a reader that reads the tag 500 and the exit attendant can review the driver's license to see if it matches the data in the computer.

Figure 12:
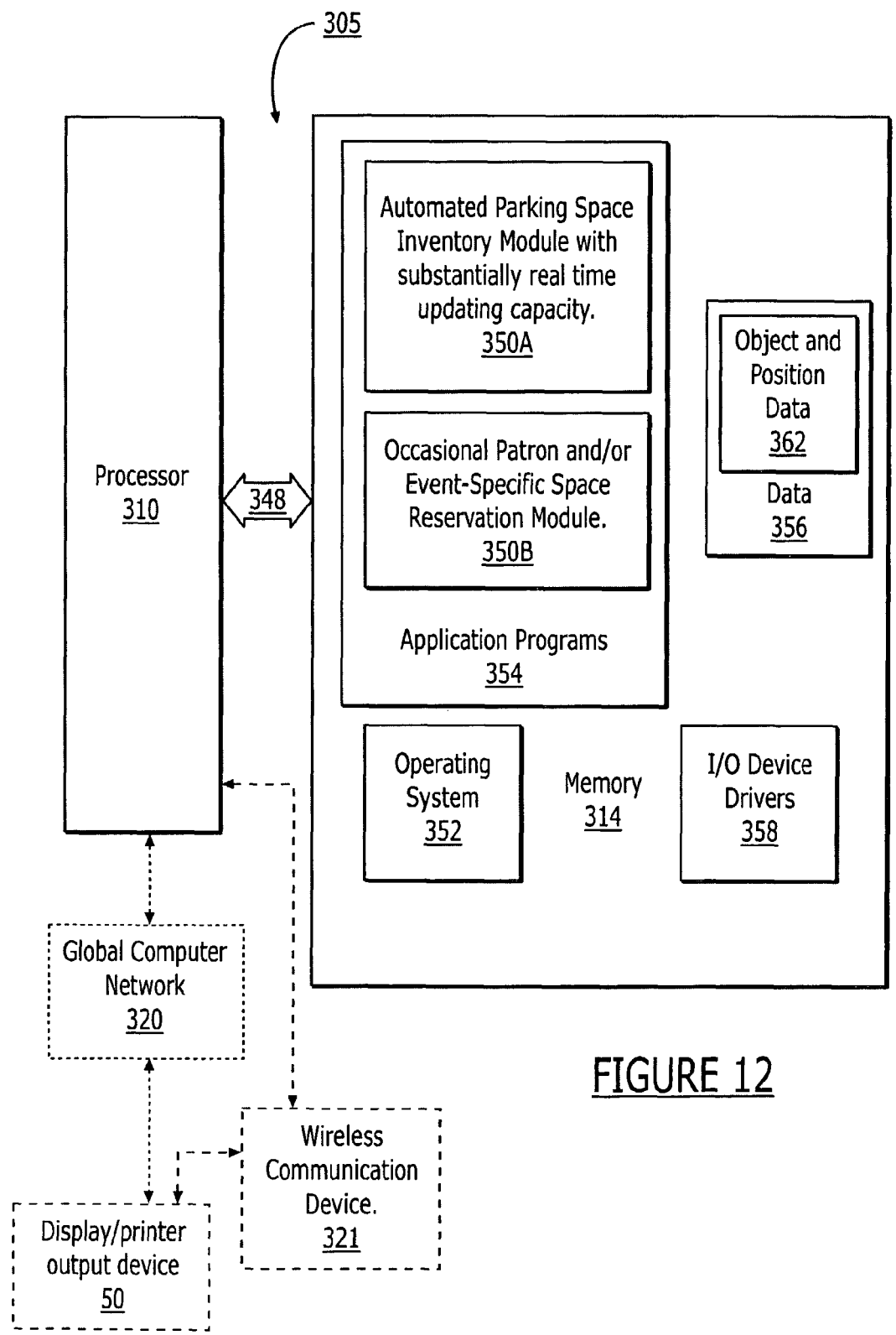
FIG. 12 is a schematic illustration of an operating system according to embodiments of the present invention.

FIG. 12 is a block diagram of exemplary embodiments of data processing systems that illustrates systems, methods, and computer program products in accordance with embodiments of the present invention. The processor 310 communicates with the memory 314 via an address/data bus 348. The processor 310 can be any commercially available or custom microprocessor. The memory 314 is representative of the overall hierarchy of memory devices containing the software and data used to implement the functionality of the data processing system 305. The memory 314 can include, but is not limited to, the following types of devices: cache, ROM, PROM, EPROM, EEPROM, flash memory, SRAM, and DRAM.

As shown in FIG. 12, the memory 314 may include several categories of software and data used in the data processing system 305: the operating system 352; the application programs 354; the input/output (I/O) device drivers 358; an automated parking space location identifier and output display module with substantially real-time updating capacity 350; and data 356.

The data 356 may include object location (occupied and/or unoccupied space position) data 362 which may be obtained directly or indirectly from the respective detectors 120. As will be appreciated by those of skill in the art, the operating system 352 may be any operating system suitable for use with a data processing system, such as OS/2, AIX or OS/390 from International Business Machines Corporation, Armonk, N.Y., WindowsXP, WindowsCE, WindowsNT, Windows95, Windows98 or Windows2000 from Microsoft Corporation, Redmond, Wash., PalmOS from Palm, Inc., MacOS from Apple Computer, UNIX, FreeBSD, or Linux, proprietary operating systems or dedicated operating systems, for example, for embedded data processing systems.

The I/O device drivers 358 typically include software routines accessed through the operating system 352 by the application programs 354 to communicate with devices such as I/O data port(s), data storage 356 and certain memory 314 components and/or the image acquisition system 320. The application programs 354 are illustrative of the programs that implement the various features of the data processing system 305 and preferably include at least one application that supports operations according to embodiments of the present invention. Finally, the data 356 represents the static and dynamic data used by the application programs 354, the operating system 352, the I/O device drivers 358, and other software programs that may reside in the memory 314.

While the present invention is illustrated, for example, with reference to the Automated Parking Space Inventory Module 350A and the Occasional Patron and/or Event Specific Reservation Module 350B being an application program in FIG. 12, as will be appreciated by those of skill in the art, other configurations may also be utilized while still benefiting from the teachings of the present invention. For example, the Modules 350A, 350B may also be incorporated into the operating system 352, the I/O device drivers 358 or other such logical division of the data processing system 305. Thus, the present invention should not be construed as limited to the configuration of FIG. 12, which is intended to encompass any configuration capable of carrying out the operations described herein.

The I/O data port can be used to transfer information between the data processing system 305 and the global network 320 (e.g., the Internet) or another computer system or other device controlled by the processor. These components may be conventional components such as those used in many conventional data processing systems, which may be configured in accordance with the present invention to operate as described herein.

In the drawings and specification, there have been disclosed embodiments of the invention and, although specific terms are employed, they are used in a generic and descriptive sense only and not for purposes of limitation, the scope of the invention being-set forth in the following claims. The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be include therein.

What is claimed is:

1. A parking reservation system for a parking lot comprising a plurality of individual parking spaces, comprising:
a plurality of object detectors, at least one in communication with one or more of the parking spaces in a parking lot comprising the plurality of individual parking spaces, wherein the object detectors are configured to detect if a parking space is vacant or occupied;
an electronic database of an inventory of available parking spaces in communication with the object detectors; and
at least one processor in communication with the electronic database, the processor being configured to:
(a) accept input regarding a request for a reserved parking space for an event specific and/or date specific need;
(b) automatically reserve a parking space for an occasional use patron of the parking lot upon receipt of a payment therefor;
(c) generate a confirmation of the reservation; and
(d) automatically adjust the database of the inventory of available spaces based on the reservation and data from the object detectors,
wherein the processor is configured to relay the inventory of parking spaces to the computer network in substantially real-time based both on the spaces detected as being open by the detectors and spaces being unreserved based on electronic reservations.

2. A parking reservation system according to claim 1, wherein the electronic database of available parking spaces is event specific.

3. A parking reservation system according to claim 1, wherein the processor is further configured to accept the user input for a reservation over a computer network.

4. A parking reservation system according to claim 1, wherein the processor is configured to wirelessly receive the request for a reserved parking space from the patron.

5. A parking reservation system according to claim 4, wherein the processor is configured to generate a downloadable printable or displayable parking pass and wirelessly transmit the downloadable pass to the patron.

6. A parking reservation system according to claim 1, wherein the processor is configured to identify the location of the available and/or unavailable parking spaces.

7. A parking reservation system according to claim 6, wherein the processor is further configured to generate a display of a map of parking spaces in the parking lot and visually contrast the available spaces from the spaces that are unavailable, wherein the map with the visually contrasted spaces is transmitted wirelessly to a mobile communications device associated with the patron, and wherein the map provides the available spaces in substantially real-time.

8. A parking reservation system according to claim 1, wherein the processor is configured to generate a confirmation that is identifiable as specific to the patron.

9. A parking reservation system according to claim 8, further comprising an electronic reader in communication with the processor that can verify that a patron entering the parking lot has a confirmed reservation.

10. A parking reservation system according to claim 1, wherein the processor is configured to generate a downloadable printable or displayable parking pass to the patron, wherein the downloadable parking pass is configured with safeguards to inhibit unauthorized duplication.

11. A system according to claim 1, wherein the processor is further configured to display a map of parking spaces in the parking lot and present the reserved unoccupied spaces in a first color, present the occupied spaces in a second color that is different from the first color, and present the available unoccupied and unreserved spaces in a third different color from the first and second colors.

12. A system according to claim 1, wherein the detectors are configured to be deactivated or placed in a sleep or standby mode for at least 15 minutes after detecting that a vehicle is detected in a parking space associated with that detector.

13. A system according to claim 1, wherein each parking space is located proximate a rail, wherein the rail comprises a reserved display sign for each parking space and comprises at least one emergency alert in communication with the object detector and processor that can automatically identify a location of where an alert is that has been triggered.

14. A system according to claim 1, wherein the system is configured to generate a tag with parking space data and patron data for each patron, and wherein each parking space is in communication with a reader that can electronically read the tag to verify that the respective patron is in the correct parking space.

15. A system according to claim 1 wherein the system is configured to correlate patron parking data to a parking space location, and wherein the system is configured to electronically search and identify a parking location and/or space of a particular patron if the patron forgets where he/she has parked.

16. A system according to claim 15, wherein the system comprises an anti-theft exit reader whereby the system reads the tag and matches data associated with the patron to a driver's license at an exit from the parking lot to verify a match.

17. A system according to claim 1, wherein the system is configured to generate a parking alert at a central station and/or locally at the parking space when a patron is in an improper parking space.

18. A system according to claim 1, wherein the system is configured to generate verbal or text messaging with navigation instructions to a portable communications device associated with a patron directing the patron to a designated parking space in a parking lot.

19. A parking reservation system for a parking lot comprising a plurality of individual parking spaces, comprising:
a plurality of object detectors, at least one in communication with one or more of the parking spaces in a parking lot comprising the plurality of individual parking spaces, wherein the object detectors are configured to detect if a parking space is vacant or occupied;
an electronic database of an inventory of available parking spaces in communication with the object detectors; and
at least one processor in communication with the electronic database, the processor being configured to:
(a) accept input regarding a request for a reserved parking space for an event specific and/or date specific need;
(b) automatically reserve a parking space for an occasional use patron of the parking lot upon receipt of a payment therefor;
(c) generate a confirmation of the reservation; and
(d) automatically adjust the database of the inventory of available spaces based on the reservation and data from the object detectors,
wherein the system is configured with an electronically adjustable grid of parking spaces associated with parking spaces in a reserved or limited access region of the parking lot, the adjustable grid of parking spaces can be adjusted in size based on demand, and wherein a defined grid size for a particular day and/or event is output to lot attendants so that physical boundaries associated therewith can be adjusted accordingly whereby the parking lot reserved and/or limited access region is adjustable in size day to day and/or event to event.

20. A parking reservation system for a parking lot comprising a plurality of individual parking spaces, comprising:
a plurality of object detectors, at least one in communication with one or more of the parking spaces in a parking lot comprising the plurality of individual parking spaces, wherein the object detectors are configured to detect if a parking space is vacant or occupied;
an electronic database of an inventory of available parking spaces in communication with the object detectors; and
at least one processor in communication with the electronic database, the processor being configured to:
(a) accept input regarding a request for a reserved parking space for an event specific and/or date specific need;
(b) automatically reserve a parking space for an occasional use patron of the parking lot upon receipt of a payment therefor;
(c) generate a confirmation of the reservation; and
(d) automatically adjust the database of the inventory of available spaces based on the reservation and data from the object detectors,
wherein the processor is configured to identify a plurality of spatially separate parking lots within a target geographical location that have vacancies including parking lots not under common ownership or management, and wherein the system comprises a server that communicates with a computer network to relay that information to the patron.

21. A parking reservation system according to claim 20, wherein the server relays to a requesting patron the identification of parking lots with vacancies and identifies both parking lots with vacancies and parking lots without vacancies, but visually presents the parking lot with vacancies in a different manner from those without vacancies.

22. A parking reservation system according to claim 20, wherein the server relays the identification of parking lots with vacancies to a wireless communication device while a patron is en route.

23. A parking reservation system according to claim 20, wherein the system identifies the available spaces in substantially real-time based both on the spaces detected as being open by the detectors and being unreserved based on electronic reservations.

24. A method of reserving parking spaces in a parking lot, comprising:
   detecting whether a space is vacant or occupied in the parking lot using electronic detectors;
   determining whether a space is reserved but unoccupied in the parking lot based on the detecting step;
   obtaining an inventory of available spaces in a parking lot based on the detecting and determining steps;
   accepting an advance request for a reservation of a parking space from an occasional use patron;
   reserving a parking space based on the accepted request for a reserved parking space; and
   updating the inventory of available spaces in the parking lot based on the reservation and the detecting and determining steps,
   wherein the step of updating available space inventory is carried out substantially continuously while reservations are being accepted and patrons are parking to provide a substantially real-time count of available parking spaces.

25. A method according to claim 24, further comprising generating a confirmation with an identifier unique to a patron's accepted reservation.

26. A method according to claim 25, further comprising transmitting the confirmation to the patron over a global computer network and/or wirelessly transmitting the confirmation to the patron.

27. A method according to claim 24, wherein the inventory is event-specific.

28. A method according to claim 24, wherein the step of accepting includes telephonically accepting reservation requests from a patron.

29. A method according to claim 24, wherein the step of accepting comprises receiving inquiries for parking space reservations that are communicated over a computer network.

30. A method according to claim 24, wherein the step of accepting comprises wirelessly receiving the request for a reserved parking space and relaying confirmation of a successful reservation to a patron.

31. A method according to claim 24, wherein the step of obtaining the inventory is configured to relay the inventory of parking spaces to a global computer network in substantially real-time.

32. A method according to claim 24, further comprising generating a confirmation that is identifiable as specific to a patron.

33. A method according to claim 32, further comprising verifying that a patron entering the parking lot has an authentic confirmed reservation.

34. A method according to claim 24, further comprising providing a downloadable printable or displayable parking pass to the patron.

35. A method according to claim 34, further comprising configuring the downloadable parking pass with visual safeguards to inhibit unauthorized duplication.

36. A method according to claim 34, further comprising wirelessly transmitting the downloadable parking pass to the patron.

37. A method according to claim 34, wherein the parking pass is accessible for downloading via the internet.

38. A method according to claim 24, further comprising controlling access to the parking lot.

39. A method according to claim 38, further comprising verifying the identity of the patron and the authenticity of the reservation proximate entry at the parking lot.

40. A method of reserving parking spaces in a parking lot, comprising:
   detecting whether a space is vacant or occupied in the parking lot using electronic detectors;
   determining whether a space is reserved but unoccupied in the parking lot based on the detecting step;
   obtaining an inventory of available spaces in a parking lot based on the detecting and determining steps;
   accepting an advance request for a reservation of a parking space from an occasional use patron;
   reserving a parking space based on the accepted request for a reserved parking space; and
   updating the inventory of available spaces in the parking lot based on the reservation and the detecting and determining steps,
   wherein the inventory is date-specific, the method further comprising:
   electronically defining a grid of parking spaces in a reserved or limited access region of the parking lot that can be adjusted in size based on demand, and wherein grid size for a particular day and/or event of the reserved or limited access region is output to lot attendants so that boundaries associated therewith can be adjusted accordingly.

41. A method of reserving parking spaces in a parking lot, comprising:
   detecting whether a space is vacant or occupied in the parking lot using electronic detectors;
   determining whether a space is reserved but unoccupied in the parking lot based on the detecting step;
   obtaining an inventory of available spaces in a parking lot based on the detecting and determining steps;
   accepting an advance request for a reservation of a parking space from an occasional use patron;
   reserving a parking space based on the accepted request for a reserved parking space;
   updating the inventory of available spaces in the parking lot based on the reservation and the detecting and determining steps; and
   identifying a plurality of spatially separate parking lots within a target geographical location that have vacancies including parking lots not under common ownership or management and relaying that information to a potential patron or user using a computer network.

42. A method according to claim 41, wherein the identification of parking lots with vacancies are relayed to the potential patron and the identification is in a graphic format that identifies both parking lots with vacancies and parking lots without vacancies, but visually presents the parking lot with vacancies in a different manner from those without vacancies.

43. A method according to claim 41, wherein the identification of parking lots with vacancies are relayed to a wireless communication device while a potential patron is en route proximate in time to when a potential patron is looking for a parking space.

44. A method of identifying parking lots with vacancies in a geographical region of interest, comprising:
   electronically providing a database of an inventory of parking lots located in a geographical region of interest;
   identifying those parking lots within the geographical region with vacancies at a time period of interest based on data from object detectors in those parking lots that detect whether a space is vacant or occupied; and
   relaying vacancy data of the parking lots identified to a potential patron requester, wherein at least some of the parking lots are not commonly owned or under common management.

45. A method according to claim 44, wherein the step of relaying comprises wirelessly relaying data associated with the identified lots having vacancies to the requester.

46. A method according to claim 45, further comprising providing an electronically accessible and searchable web page with data on parking lots in different geographical areas.

47. A method according to claim 45, further comprising connecting the requester to a telephone or computer associated with an identified parking lot.

48. A method according to claim 44, wherein the step of relaying comprises relaying data associated with the identified lots having vacancies to the requester over a computer network.

49. A method according to claim 48, wherein the computer network is a global computer network.

50. A method according to claim 49, further comprising providing an electronically accessible and searchable web page with data on parking lots in different geographical areas, and wherein the step of relaying is carried out to provide the vacancy data responsive to the search parameters input by the requester with respect to the data supporting the web page.

51. A method according to claim 44, wherein the relayed vacancy data includes parking lot information includes a graphic visual display of parking lots on a map with those having vacancies shown thereon.

52. A method according to claim 44, further comprising updating the vacancy data for parking lots at least hourly during business hours.

53. A method according to claim 52, further comprising updating the vacancy data or information for the parking lots in substantially real-time.

54. A method according to claim 52, wherein the data indicates the aggregate numbers of available spaces in a plurality of identified lots.

55. A method according to claim 52, wherein the data just summarizes parking lots that identify themselves as having vacancies.

56. A method according to claim 44, further comprising identifying a space location of a parking space that is available for reservation and automatically providing the location of the identified available space to at least one output device in substantially real-time to a portable wireless communication device or a vehicle.

57. A method according to claim 44, wherein the step of relaying the vacancy data is configured to electronically generate and provide the requester a visual map display of the region of interest with locations of the identified parking lots with relayed vacancy data and show the parking lots with vacancies in a different manner from those without vacancies.

58. A method of identifying parking lots with vacancies in a geographical region of interest, comprising:
  electronically providing a database of an inventory of parking lots located in a geographical region of interest;
  identifying those parking lots within the geographical region with vacancies at a time period of interest based on data from object detectors in those parking lots that detect whether a space is vacant or occupied; and
  relaying vacancy data of the parking lots identified to a requester,
  wherein the step of relaying vacancy data of the parking lots in the region of interest comprises:
  generating a visual map display of the region of interest with locations of the identified parking lots with relayed vacancy data and configuring the display to allow a requester to adjust a boundary of interest and automatically updating the visual display with the parking lots identified that reside within a perimeter of the adjusted boundary.

59. A method according to claim 58, wherein the relaying step relays a list of parking lots having vacancies based on input from object detectors in the parking lots that electronically detect whether a parking space is occupied and based on virtual reservations of spaces, the list including names and addresses thereof, and wherein the method further comprising compiling the list to present the lots in an order with a predetermined ordering arrangement.

60. A method according to claim 59, wherein the step of compiling comprises allowing the requester to input personal preferences and sorting the list based on the input.

61. A method according to claim 60, wherein the personal preferences include the target destination of the requester, and wherein the list presents the identified lots in the order of the closest in proximity to the target destination.

62. A method according to claim 59, wherein the ordering is carried out such that identified parking lots with vacancies that have larger numbers of vacancies are listed proximate the top of the list.

63. A method of identifying parking lots with vacancies in a geographical region of interest, comprising:
  electronically providing a database of an inventory of parking lots located in a geographical region of interest;
  identifying those parking lots within the geographical region with vacancies at a time period of interest based on data from object detectors in those parking lots that detect whether a space is vacant or occupied; and
  relaying vacancy data of the parking lots identified to a requester, wherein the relayed vacancy data includes parking lot information includes a graphic visual display of parking lots on a map with those having vacancies shown thereon, and wherein parking lots without vacancies are shown on the display in a manner different from the lots with vacancies on the map, wherein the parking lots without vacancies are shown with an "X" over their parking lot on the display.

64. A method of identifying parking lots with vacancies in a geographical region of interest, comprising;
  electronically providing a database of an inventory of parking lots located in a geographical region of interest;
  identifying those parking lots within the geographical region with vacancies at a time period of interest based on data from object detectors in those parking lots that detect whether a space is vacant or occupied;
  relaying vacancy data of the parking lots identified to a requester;
  displaying a visual grid of a target geographical area of interest;
  allowing the requester to touch the screen on the display to select the target destination in the geographical area of interest; and
  displaying the parking lots identified as having vacancies in response thereto, wherein at least some of the parking lots are not commonly owned or under common management.

65. A method according to claim 64, further comprising removing a parking lot from the inventory of those identified as having vacancies responsive to when a parking lot sends a message to a monitoring computer that controls the inventory database to delist it therefrom for an event or on a particular time and/or date.

66. A system of identifying parking lots with vacancies in a geographical region of interest, comprising:
- means for electronically providing a database of an inventory of parking lots located in a geographical region of interest;
- means for identifying those parking lots within the geographical region with vacancies at a time period of interest, wherein the parking lots have object detectors that identify whether a parking space is vacant or occupied, and wherein the means for indentifying obtains vacancy data from the parking lots based on occupancy or vacancy information provided by the object detectors; and
- means for relaying vacancy data or information of each of the parking lots identified to a requester,
- wherein the means for providing the inventory of parking lots with vacancies comprises at least one processor that is configured to identify a plurality of spatially separate parking lots within a target geographical location that have vacancies including parking lots not under common ownership or management, and wherein the system comprises a server that communicates with a computer network to relay that information to the requester.

67. A system according to claim 66, wherein the means for relaying comprises means for wirelessly relaying data associated with the identified lots having vacancies to the requester.

68. A system according to claim 66, wherein the means for relaying comprises means for relaying data associated with the identified lots having vacancies to the requester over a computer network.

69. A system of identifying parking lots with vacancies in a geographical region of interest, comprising:
- means for electronically providing a database of an inventory of parking lots located in a geographical region of interest;
- means for identifying those parking lots within the geographical region with vacancies at a time period of interest, wherein the parking lots have object detectors that identify whether a parking space is vacant or occupied, and wherein the means for indentifying obtains vacancy data from the parking lots based on occupancy or vacancy information provided by the object detectors; and
- means for relaying vacancy data or information of each of the parking lots identified to a requester, wherein the means for relaying the vacancy data is configured to generate a list of parking lots in the desired geographical region to the requester and present the list with the parking lots in a rotating order so that different parking lots are listed first for different requesters.

70. A system of identifying parking lots with vacancies in a geographical region of interest, comprising:
- means for electronically providing a database of an inventory of parking lots located in a geographical region of interest;
- means for identifying those parking lots within the geographical region with vacancies at a time period of interest, wherein the parking lots have object detectors that identify whether a parking space is vacant or occupied, and wherein the means for indentifying obtains vacancy data from the parking lots based on occupancy or vacancy information provided by the object detectors; and
- means for relaying vacancy data or information of each of the parking lots identified to a requester, wherein the system is configured to generate a list of parking lots in the desired geographical region to the requester and present the list with the parking lots in a rotating order so that different parking lots are listed first for different requesters.

71. A system of identifying parking lots with vacancies in a geographical region of interest, comprising:
- means for electronically providing a database of an inventor of parking lots located in a geographical region of interest:
- means for identifying those parking lots within the geographical region with vacancies at a time period of interest, wherein the parking lots have object detectors that identify whether a parking space is vacant or occupied, and wherein the means for indentifying obtains vacancy data from the parking lots based on occupancy or vacancy information provided by the object detectors; and
- means for relaying vacancy data or information of each of the parking lots identified to a requester, wherein the means for relaying the vacancy data is configured to electronically generate and wirelessly provide to a mobile communications device associated with the requester a visual map display of the region of interest showing locations of the identified parking lots with relayed vacancy data and showing the parking lots with vacancies in a different manner from those without vacancies, and wherein the map display of the region of interest is configured to allow a requester to adjust a boundary about the region of interest.

72. A parking reservation system for a parking lot comprising a plurality of individual parking spaces, comprising:
- a plurality of object detectors, at least one in communication with one or more of the parking spaces in a parking lot comprising the plurality of individual parking spaces, wherein the object detectors are configured to detect if a parking space is vacant or occupied;
- an electronic database of an inventory of available parking spaces in communication with the object detectors; and
- at least one processor in communication with the electronic database, the processor being configured to:
  - (a) accept input regarding a request for a reserved parking space for an event specific and/or date specific need;
  - (b) automatically reserve a parking space for an occasional use patron of the parking lot upon receipt of a payment therefor;
  - (c) generate a confirmation of the reservation; and
  - (d) automatically adjust the database of the inventory of available spaces based on the reservation and data from the object detectors,
- wherein the system is configured to automatically adjust a size of a reserved zone within a parking lot based on user-demand for an event, and provide the parking lot with a perimeter size of the reserved zone for adjusting a physical size of the reserved zone for an event-specific parking configuration.

73. A method of reserving parking spaces in a parking lot, comprising:
- detecting whether a space is vacant or occupied in the parking lot using electronic detectors;
- determining whether a space is reserved but unoccupied in the parking lot based on the detecting step;
- obtaining an inventory of available spaces in a parking lot based on the detecting and determining steps;

accepting an advance request for a reservation of a parking space from an occasional use patron;

reserving a parking solace based on the accepted request for a reserved parking solace;

updating the inventor of available spaces in the parking lot based on the reservation and the detecting and determining steps;

electronically adjusting a size of a reserved parking zone in a parking lot based on the updating step; and calculating a perimeter size of the reserved parking zone based on the adjusting step and providing the calculated perimeter size to the parking lot for a day-specific and/or an event-specific parking configuration.

* * * * *

UNITED STATES PATENT AND TRADEMARK OFFICE
CERTIFICATE OF CORRECTION

PATENT NO.        : 7,783,530 B2
APPLICATION NO.   : 10/457889
DATED             : August 24, 2010
INVENTOR(S)       : Slemmer et al.

Page 1 of 1

It is certified that error appears in the above-identified patent and that said Letters Patent is hereby corrected as shown below:

Column 24, Claim 71, Lines 8-9: Please correct "inventor" to read -- inventory --

Column 25, Claim 73, Line 3: Please correct "solace" to read -- space --
Line 4: Please correct "solace" to read -- space --
Line 5: Please correct "inventor" to read -- inventory --

Signed and Sealed this
Eighteenth Day of January, 2011

David J. Kappos
*Director of the United States Patent and Trademark Office*